United States Patent
Segapelli et al.

(10) Patent No.: US 11,375,142 B1
(45) Date of Patent: Jun. 28, 2022

(54) ASYMMETRIC EXPOSURE TIME ADJUSTMENTS FOR MULTI-FRAME HIGH DYNAMIC RANGE IMAGING IN LOW LIGHT CONDITIONS

(71) Applicant: QUALCOMM Incorporated, San Diego, CA (US)

(72) Inventors: Loic Francois Segapelli, San Diego, CA (US); Soman Ganesh Nikhara, Hyderabad (IN); Ho Sang Lee, San Diego, CA (US); Mahesh Katta, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/471,738

(22) Filed: Sep. 10, 2021

(51) Int. Cl.
*H04N 5/355* (2011.01)
*H04N 5/232* (2006.01)

(52) U.S. Cl.
CPC ..... *H04N 5/35581* (2013.01); *H04N 5/23232* (2013.01); *H04N 5/23245* (2013.01)

(58) Field of Classification Search
CPC ............. H04N 5/23245; H04N 5/2352; H04N 5/2353; H04N 5/2351; H04N 5/2355; H04N 5/238; H04N 5/243; H04N 5/347; H04N 5/35554; H04N 5/35581; H04N 5/374; H04N 5/23232
See application file for complete search history.

(56) References Cited

U.S. PATENT DOCUMENTS

| | | | | |
|---|---|---|---|---|
| 2009/0147122 A1* | 6/2009 | Kato | ................... | H04N 5/23245 348/E5.025 |
| 2010/0277631 A1* | 11/2010 | Sugiyama | .............. | H04N 5/374 348/297 |
| 2012/0212663 A1* | 8/2012 | Takita | .................... | H04N 5/238 348/E5.04 |
| 2018/0343375 A1* | 11/2018 | Duran | .................. | H04N 5/2351 |

* cited by examiner

*Primary Examiner* — Chiawei Chen
(74) *Attorney, Agent, or Firm* — Holland & Hart LLP/Qualcomm

(57) ABSTRACT

Methods, systems, and devices for asymmetric exposure time adjustments for multi-frame (MF) high dynamic range (HDR) imaging in low light conditions are described. In some implementations, a device may receive a set of frames including short exposure frames associated with a first exposure time and long exposure frames associated with a second exposure time and may adjust the second exposure time associated with the long exposure frames to obtain a third exposure time for the long exposure frames based on detecting a low light condition associated with the set of frames. The device may adjust the second exposure time associated with the long exposure frames to obtain the third exposure time for the long exposure frames based on adding, at an image sensor of the device, an additional set of blanking lines to a set of visible lines associated with the short exposure frames.

20 Claims, 13 Drawing Sheets

ASYMMETRIC EXPOSURE TIME ADJUSTMENTS FOR MULTI-FRAME HIGH DYNAMIC RANGE IMAGING IN LOW LIGHT CONDITIONS

FIELD OF TECHNOLOGY

The following relates to image processing, including techniques for asymmetric exposure time adjustments for multi-frame (MF) high dynamic range (HDR) imaging in low light conditions.

BACKGROUND

Systems are widely deployed to provide various types of multimedia communication content such as voice, video, packet data, messaging, broadcast, and so on. These systems may be capable of processing, storage, generation, manipulation and rendition of multimedia information. Examples of systems include entertainment systems, information systems, virtual reality systems, model and simulation systems, and so on. These systems may employ a combination of hardware and software technologies to support processing, storage, generation, manipulation and rendition of multimedia information, for example, such as capture devices, storage devices, communication networks, computer systems, and display devices. In some cases, these systems may expose two or more video frames with different exposures and combine pixel values of each of the two or more video frames to obtain a single HDR frame.

SUMMARY

The described techniques relate to improved methods, systems, devices, and apparatuses that support asymmetric exposure time adjustments for MF HDR imaging in low light conditions. The device may dynamically and asymmetrically adjust exposure times for various video frames based on detecting a low light condition. For example, a device (such as a camera device) may receive a set of video frames including a first subset of frames (e.g., short exposure frames) associated with a first exposure time and a second subset of frames (e.g., long exposure frames) associated with a second exposure time. If the device detects a low light condition (e.g., a luminance level satisfying a threshold) associated with the set of video frames, the device may asymmetrically adjust one or both of the first exposure time or the second exposure time. In other words, based on detecting the low light condition, the device may increase the second exposure time associated with the second subset of frames and may refrain from adjusting the first exposure time associated with the first subset of frames.

DETAILED DESCRIPTION

Figure 1:
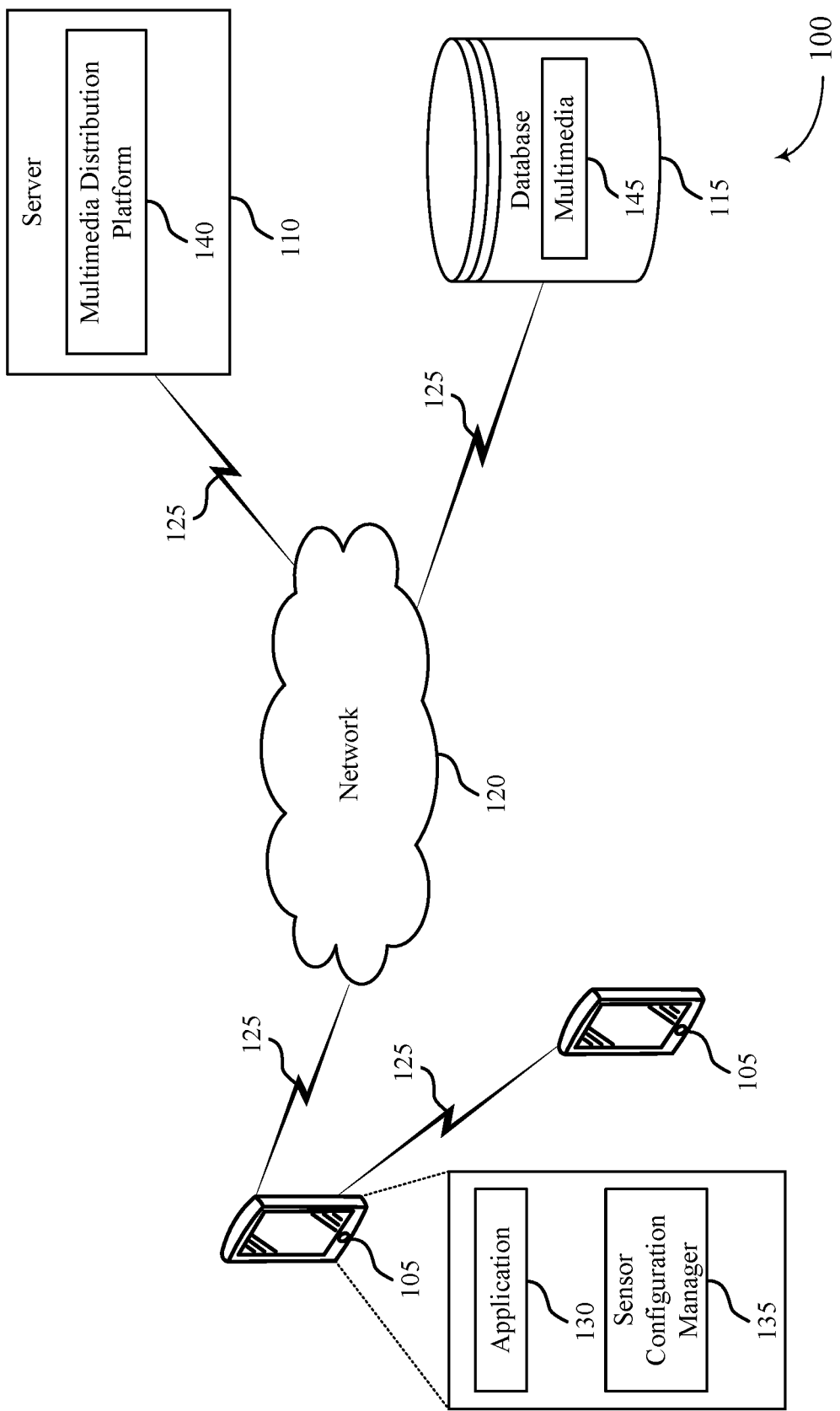
FIG. 1 illustrates an example of a multimedia system that supports asymmetric exposure time adjustments for MF HDR imaging in low light conditions in accordance with aspects of the present disclosure.

Some conditions, such as bright light conditions, HDR image processing may be beneficial and provide high quality images, but image quality may deteriorate in some other conditions, such as in low light conditions. For example, some HDR image processing may involve a use of two different types of frames including "short exposure" frames (e.g., frames that a device may expose to light or allow to gather photons for relatively shorter durations) and "long exposure" frames (e.g., frames that a device may expose to light or allow to gather photons for relatively longer durations) and a combination of one short exposure frame and one long exposure frame to obtain an HDR frame, which may provide high quality images in bright light conditions. Such HDR image processing may be referred to herein as multi-frame MF HDR image processing based on the use of the two different types of frames. In low light conditions, however, the short exposure frames may interfere with the long exposure frames. For example, a short exposure frame may occupy time that could have otherwise been allocated exclusively for a long exposure frame (which may provide better results in low light conditions). As such, images associated with a low light condition may appear significantly darker as a result of MF HDR image processing.

Various aspects of the present disclosure support enabling a device to perform one or multiple operations related to asymmetrically adjusting the exposure times for input frames such that an exposure time for short exposure frames is maintained while an exposure time for long exposure frames is throttled up (increased in time duration) in low light conditions. In other words, the device may, upon detecting a low light condition, perform an asymmetric exposure time adjustment according to which the exposure time for short exposure frames is maintained while the exposure time for long exposure frames is increased. In some examples, the device may achieve such an increase for the exposure time associated with the long exposure frames based on increasing a sensor blanking, and, accordingly, a sensor frame line length, to pad the long exposure frames while refraining from increasing a sensor blanking to pad the short exposure frames.

Particular implementations of the subject matter described herein can be implemented to realize one or more of the following advantages. For example, based on implementing such an asymmetric adjustment for exposure times for MF HDR image processing, the device may achieve greater image quality across various light conditions, including low light conditions. Additionally, the described techniques may be implemented to realize greater algorithmic accuracy, which may further assist in providing for high image quality across various light conditions while potentially reducing processing or power costs at the device.

Aspects of the disclosure are initially described in the context of a multimedia system. Additionally, aspects of the disclosure are illustrated by and described with reference to sensing timing diagrams. Aspects of the disclosure are further illustrated by and described with reference to apparatus diagrams, system diagrams, and flowcharts that relate to asymmetric exposure time adjustments for MF HDR imaging in low light conditions.

FIG. 1 illustrates a multimedia system 100 for a device that supports asymmetric exposure time adjustments for MF HDR imaging in low light conditions in accordance with aspects of the present disclosure. The multimedia system 100 may include devices 105, a server 110, and a database 115. Although, the multimedia system 100 illustrates two devices 105, a single server 110, a single database 115, and a single network 120, the present disclosure applies to any multimedia system architecture having one or more devices 105, servers 110, databases 115, and networks 120. The devices 105, the server 110, and the database 115 may communicate with each other and exchange information that supports asymmetric exposure time adjustments for MF HDR imaging in low light conditions, such as multimedia packets, multimedia data, or multimedia control information, via network 120 using communications links 125. In some cases, a portion or all of the techniques described herein supporting asymmetric exposure time adjustments for MF HDR imaging in low light conditions may be performed by the devices 105 or the server 110, or both.

A device 105 may be a cellular phone, a smartphone, a personal digital assistant (PDA), a wireless communication device, a handheld device, a tablet computer, a laptop computer, a cordless phone, a display device (e.g., monitors), or the like that supports various types of communication and functional features related to multimedia (e.g., transmitting, receiving, broadcasting, streaming, sinking, capturing, storing, and recording multimedia data). A device 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, or some other suitable terminology. In some cases, the devices 105 may also be able to communicate directly with another device (e.g., using a peer-to-peer (P2P) or device-to-device (D2D) protocol). For example, a device 105 may be able to receive from or transmit to another device 105 variety of information, such as instructions or commands (e.g., multimedia-related information).

The devices 105 may include an application 130 and a sensor configuration manager 135. While, the multimedia system 100 illustrates the devices 105 including both the application 130 and the sensor configuration manager 135, the application 130 and the sensor configuration manager 135 may be an optional feature for the devices 105. In some cases, the application 130 may be a multimedia-based application that can receive (e.g., download, stream, broadcast) from the server 110, database 115 or another device 105, or transmit (e.g., upload) multimedia data to the server 110, the database 115, or to another device 105 via using communications links 125.

The sensor configuration manager 135 may be part of a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, or the like. For example, the sensor configuration manager 135 may process multimedia (e.g., image data, video data, audio data) from or write multimedia data to a local memory of the device 105 or to the database 115.

The sensor configuration manager 135 may also be configured to provide multimedia enhancements, multimedia restoration, multimedia analysis, multimedia compression, multimedia streaming, and multimedia synthesis, among other functionality. For example, the sensor configuration manager 135 may perform white balancing, cropping, scaling (e.g., multimedia compression), adjusting a resolution, multimedia stitching, color processing, multimedia filtering, spatial multimedia filtering, artifact removal, frame rate adjustments, multimedia encoding, multimedia decoding, and multimedia filtering. By further example, the sensor configuration manager 135 may process multimedia data to support asymmetric exposure time adjustments for MF HDR imaging in low light conditions, according to the techniques described herein.

The server 110 may be a data server, a cloud server, a server associated with an multimedia subscription provider, proxy server, web server, application server, communications server, home server, mobile server, or any combination thereof. The server 110 may in some cases include a multimedia distribution platform 140. The multimedia distribution platform 140 may allow the devices 105 to discover, browse, share, and download multimedia via network 120 using communications links 125, and therefore provide a digital distribution of the multimedia from the multimedia distribution platform 140. As such, a digital distribution may be a form of delivering media content such as audio, video, images, without the use of physical media but over online delivery mediums, such as the Internet. For example, the devices 105 may upload or download multimedia-related applications for streaming, downloading, uploading, processing, enhancing, etc. multimedia (e.g., images, audio, video). The server 110 may also transmit to the devices 105 a variety of information, such as instructions or commands (e.g., multimedia-related information) to download multimedia-related applications on the device 105.

The database 115 may store a variety of information, such as instructions or commands (e.g., multimedia-related information). For example, the database 115 may store multimedia 145. The device may support asymmetric exposure time adjustments for MF HDR imaging in low light conditions associated with the multimedia 145. The device 105 may retrieve the stored data from the database 115 via the network 120 using communications links 125. In some examples, the database 115 may be a relational database (e.g., a relational database management system (RDBMS) or a Structured Query Language (SQL) database), a non-relational database, a network database, an object-oriented database, or other type of database, that stores the variety of information, such as instructions or commands (e.g., multimedia-related information).

The network 120 may provide encryption, access authorization, tracking, Internet Protocol (IP) connectivity, and other access, computation, modification, or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 120 may include the Internet.

The communications links 125 shown in the multimedia system 100 may include uplink transmissions from the device 105 to the server 110 and the database 115, or downlink transmissions, from the server 110 and the database 115 to the device 105. The communications links 125 may transmit bidirectional communications or unidirectional communications. In some examples, the communications links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, or other connection types related to wireless communication systems.

The device 105 (e.g., using an auto exposure algorithm) may continuously, constantly, or periodically determine a brightness of a set of incoming video frames and determine, based on the brightness of the incoming video frames, whether to adjust one or more exposure times associated with the set of video frames. For example, the device 105 may constantly measure or determine a brightness of a set of short exposures (e.g., short exposure frames) and a set of long exposures (e.g., long exposure frames) and determine whether to adjust (e.g., increase) a time duration associated with the exposures based on the measured or determined brightness. Such a measured or determined brightness may correspond to or otherwise be associated with a light condition of the set of video frames and, if the measured or determined brightness is below a first threshold, the device 105 may determine that the set of video frames are associated with a low light condition. Alternatively, if the measured or determined brightness is greater than a second threshold, the device 105 may determine that the set of video frames are associated with a bright or high light condition. In other words, the device 105 may constantly determine whether an average brightness of an image is within a "brightness range" (e.g., not too bright and not too dark). If the device 105 determines to increase the exposures, the device 105 may increase the exposures by increasing gain, time, or aperture (where aperture refers to a size of a lens opening in cases of digital single-lens reflex (DSLR) cameras).

As part of the adjustment to the exposure times, the device 105 may adjust one of a short exposure or a long exposure or may adjust both short and long exposures with different magnitudes (e.g., may increase a duration of long exposures more than a duration of short exposures) or in different directions (e.g., may increase a duration of long exposures and decrease a duration of short exposures). For example, to determine an asymmetric exposure time (or an asymmetric adjustment to exposure time), the device 105 may set a tuning to allocate some amount of time to the short exposure (e.g., $\frac{1}{120}$ seconds or up to $\frac{1}{120}$ seconds) and some other (e.g., larger) amount of time to the long exposure (e.g., $\frac{3}{120}$ seconds or up to $\frac{3}{120}$ seconds).

The techniques described herein may provide improvements in auto exposure. Further, the techniques described herein may provide benefits and enhancements to the operation of the devices 105. For example, by asymmetrically adjusting exposure times across various types of frames, which may result in improved image quality in some light conditions or improved algorithmic accuracy, the operational characteristics, such as power consumption, processor utilization (e.g., DSP, CPU, GPU, ISP processing utilization), and memory usage of the devices 105 may be reduced. The techniques described herein may also provide MF HDR image processing efficiency to the devices 105 by reducing latency associated with processes related to auto focus.

Figure 2:
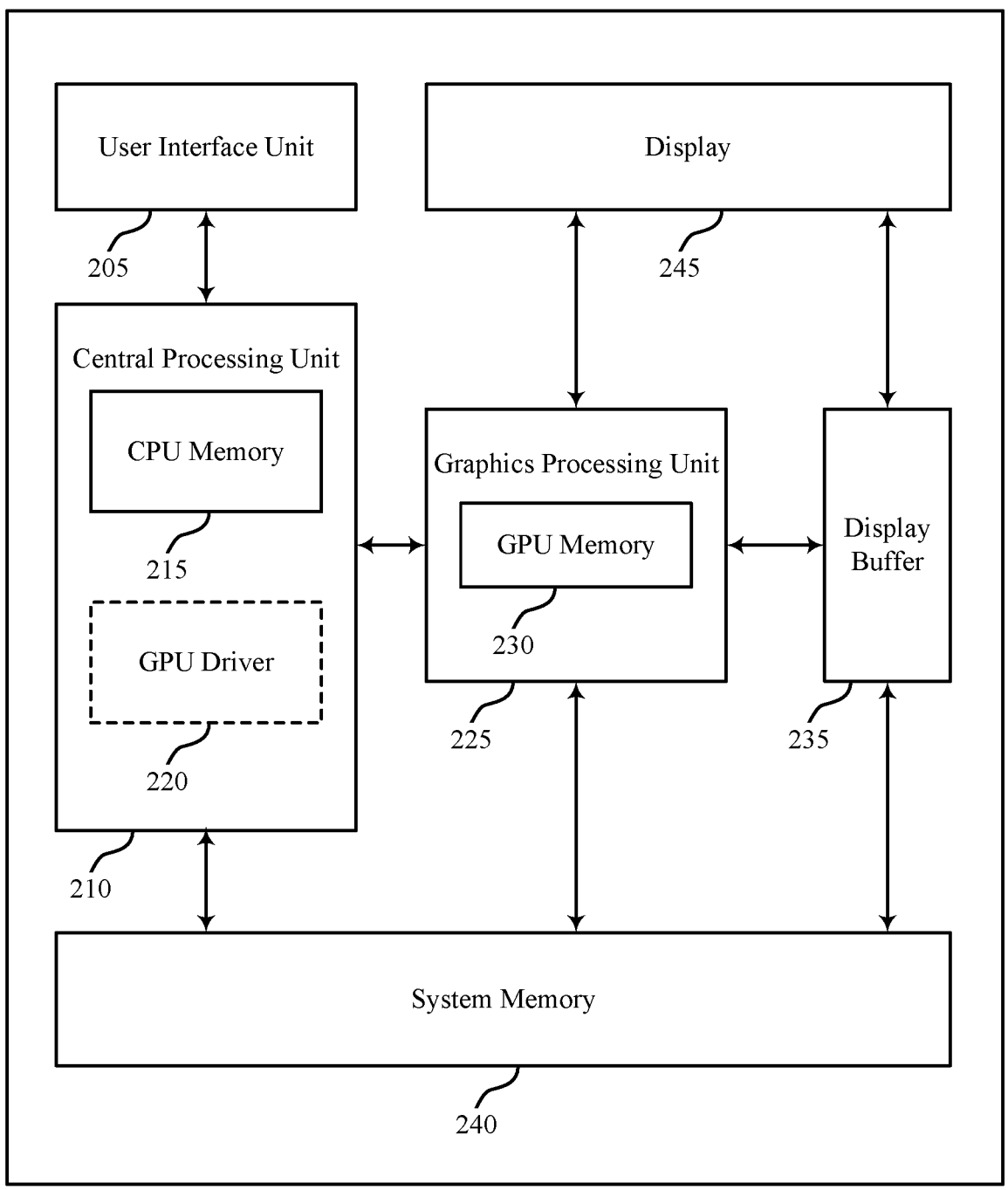
FIG. 2 illustrates an example of a device that supports asymmetric exposure time adjustments for MF HDR imaging in low light conditions in accordance with aspects of the present disclosure.

FIG. 2 illustrates an example of a device 200 that supports asymmetric exposure time adjustments for MF HDR imaging in low light conditions in accordance with aspects of the present disclosure. The device 200 includes a central processing unit (CPU) 210 having CPU memory 215, a GPU 225 having GPU memory 230, a display 245, a display buffer 235 storing data associated with rendering, a user interface unit 205, and a system memory 240. For example, system memory 240 may store a GPU driver 220 (illustrated as being contained within CPU 210 as described herein) having a compiler, a GPU program, a locally-compiled GPU program, and the like. User interface unit 205, CPU 210, GPU 225, system memory 240, and display 245 may communicate with each other (e.g., using a system bus).

Examples of CPU 210 include, but are not limited to, a digital signal processor (DSP), general purpose microprocessor, application specific integrated circuit (ASIC), field programmable logic array (FPGA), or other equivalent integrated or discrete logic circuitry. Although CPU 210 and GPU 225 are illustrated as separate units in the example of FIG. 2, in some examples, CPU 210 and GPU 225 may be integrated into a single unit. CPU 210 may execute one or more software applications. Examples of the applications may include operating systems, word processors, web browsers, e-mail applications, spreadsheets, video games, audio or video capture, playback or editing applications, or other such applications that initiate the generation of image data to be presented via display 245. As illustrated, CPU 210 may include CPU memory 215. For example, CPU memory 215 may represent on-chip storage or memory used in executing machine or object code. CPU memory 215 may include one or more volatile or non-volatile memories or storage devices, such as flash memory, a magnetic data media, an optical storage media, etc. CPU 210 may be able to read values from or write values to CPU memory 215 more quickly than reading values from or writing values to system memory 240, which may be accessed, e.g., over a system bus.

GPU 225 may represent one or more dedicated processors for performing graphical operations. That is, for example, GPU 225 may be a dedicated hardware unit having fixed function and programmable components for rendering graphics and executing GPU applications. GPU 225 may also include a DSP, a general purpose microprocessor, an ASIC, an FPGA, or other equivalent integrated or discrete logic circuitry. GPU 225 may be built with a highly-parallel structure that provides more efficient processing of complex graphic-related operations than CPU 210. For example, GPU 225 may include a plurality of processing elements that are configured to operate on multiple vertices or pixels in a parallel manner. The highly parallel nature of GPU 225 may allow GPU 225 to generate graphic images (e.g., graphical user interfaces and two-dimensional or three-dimensional graphics scenes) for display 245 more quickly than CPU 210.

GPU 225 may, in some instances, be integrated into a motherboard of device 200. In other instances, GPU 225 may be present on a graphics card that is installed in a port in the motherboard of device 200 or may be otherwise incorporated within a peripheral device configured to interoperate with device 200. As illustrated, GPU 225 may include GPU memory 230. For example, GPU memory 230 may represent on-chip storage or memory used in executing machine or object code. GPU memory 230 may include one or more volatile or non-volatile memories or storage devices, such as flash memory, a magnetic data media, an optical storage media, etc. GPU 225 may be able to read values from or write values to GPU memory 230 more quickly than reading values from or writing values to system memory 240, which may be accessed, e.g., over a system bus. That is, GPU 225 may read data from and write data to GPU memory 230 without using the system bus to access off-chip memory. This operation may allow GPU 225 to operate in a more efficient manner by reducing the constraint for GPU 225 to read and write data via the system bus, which may experience heavy bus traffic.

Display 245 represents a unit capable of displaying video, images, text or any other type of data for consumption by a viewer. Display 245 may include a liquid-crystal display (LCD), a light emitting diode (LED) display, an organic LED (OLED), an active-matrix OLED (AMOLED), or the like. Display buffer 235 represents a memory or storage device dedicated to storing data for presentation of imagery, such as computer-generated graphics, still images, video frames, or the like for display 245. Display buffer 235 may represent a two-dimensional buffer that includes a plurality of storage locations. The number of storage locations within display buffer 235 may, in some cases, correspond to the number of pixels to be displayed on display 245. For example, if display 245 is configured to include 640×480 pixels, display buffer 235 may include 640×480 storage locations storing pixel color and intensity information, such as red, green, and blue pixel values, or other color values. Display buffer 235 may store the final pixel values for each of the pixels processed by GPU 225. Display 245 may retrieve the final pixel values from display buffer 235 and display the final image based on the pixel values stored in display buffer 235.

User interface unit 205 represents a unit with which a user may interact with or otherwise interface to communicate with other units of device 200, such as CPU 210. Examples of user interface unit 205 include, but are not limited to, a trackball, a mouse, a keyboard, and other types of input devices. User interface unit 205 may also be, or include, a touch screen and the touch screen may be incorporated as part of display 245.

System memory 240 may comprise one or more computer-readable storage media. Examples of system memory 240 include, but are not limited to, a random-access memory (RAM), static RAM (SRAM), dynamic RAM (DRAM), a read-only memory (ROM), an electrically erasable programmable read-only memory (EEPROM), a compact disc read-only memory (CD-ROM) or other optical disc storage, magnetic disc storage, or other magnetic storage devices, flash memory, or any other medium that can be used to store desired program code in the form of instructions or data structures and that can be accessed by a computer or a processor. System memory 240 may store program modules or instructions that are accessible for execution by CPU 210.

Additionally or alternatively, system memory 240 may store user applications and application surface data associated with the applications. System memory 240 may in some cases store information for use by or information generated by other components of device 200. For example, system memory 240 may act as a device memory for GPU 225 and may store data to be operated on by GPU 225 as well as data resulting from operations performed by GPU 225

In some examples, system memory 240 may include instructions that cause CPU 210 or GPU 225 to perform the functions ascribed to CPU 210 or GPU 225 in aspects of the present disclosure. System memory 240 may, in some examples, be considered as a non-transitory storage medium. The term "non-transitory" should not be interpreted to mean that system memory 240 is non-movable. As one example, system memory 240 may be removed from device 200 and moved to another device. As another example, a system memory substantially similar to system memory 240 may be inserted into device 200. In some examples, a non-transitory storage medium may store data that can, over time, change (e.g., in RAM).

System memory 240 may store a GPU driver 220 and compiler, a GPU program, and a locally-compiled GPU program. The GPU driver 220 may represent a computer program or executable code that provides an interface to access GPU 225. CPU 210 may execute the GPU driver 220 or portions thereof to interface with GPU 225 and, for this reason, GPU driver 220 is shown in the example of FIG. 2 within CPU 210. GPU driver 220 may be accessible to programs or other executables executed by CPU 210, including the GPU program stored in system memory 240. Thus, when one of the software applications executing on CPU 210 uses graphics processing, CPU 210 may provide graphics commands and graphics data to GPU 225 for rendering to display 245 (e.g., via GPU driver 220).

In some cases, the GPU program may include code written in a high level (HL) programming language, e.g., using an application programming interface (API). Examples of APIs include Open Graphics Library ("OpenGL"), DirectX, Render-Man, WebGL, or any other public or proprietary standard graphics API. The instructions may also conform to so-called heterogeneous computing libraries, such as Open-Computing Language ("OpenCL"), DirectCompute, etc. In general, an API includes a predetermined, standardized set of commands that are executed by associated hardware. API commands allow a user to instruct hardware components of a GPU 225 to execute commands without user knowledge as to the specifics of the hardware components. In order to process the graphics rendering instructions, CPU 210 may issue one or more rendering commands to GPU 225 (e.g., through GPU driver 220) to cause GPU 225 to perform some or all of the rendering of the graphics data. In some examples, the graphics data to be rendered may include a list of graphics primitives (e.g., points, lines, triangles, quadrilaterals, etc.).

The GPU program stored in system memory 240 may invoke or otherwise include one or more functions provided by GPU driver 220. CPU 210 executes the program in which the GPU program is embedded and, upon encountering the GPU program, passes the GPU program to GPU driver 220. CPU 210 executes GPU driver 220 in this context to process the GPU program. That is, for example, GPU driver 220 may process the GPU program by compiling the GPU program into object or machine code executable by GPU 225. This object code may be referred to as a locally-compiled GPU program. In some examples, a compiler associated with GPU driver 220 may operate in real-time or near-real-time to compile the GPU program during the execution of the program in which the GPU program is embedded. For example, the compiler represents a unit that reduces HL instructions defined in accordance with a HL programming language to low-level (LL) instructions of a LL programming language. After compilation, these LL instructions are capable of being executed by specific types of processors or other types of hardware, such as FPGAs, ASICs, and the like (including, but not limited to, CPU 210 and GPU 225).

In some implementations, the device 200 may perform an asymmetrical adjustment to exposure times associated with different types of frames. For example, the device 200 may receive a set of frames (e.g., a set of video frames) including a first subset of frames associated with a first exposure time (e.g., such as a set of short exposure frames associated with a relatively shorter exposure time) and a second subset of frames associated with a second exposure time (e.g., such as a set of long exposure frames associated with a relatively longer exposure time) and the device 200 may apply an asymmetrical adjustment to one or both of the first exposure time and the second exposure time. In some examples, the device 200 may implement such an asymmetric adjustment to exposure time based on setting different upper limits for the different frame types. For example, the device 200 may set a first upper limit (e.g., $1/120$ or $1/60$ seconds) for the first exposure time associated with short exposure frames and may set a second supper limit (e.g., $3/120$ or $3/60$ seconds) for the second exposure time associated with long exposure frames.

As part of such an asymmetric adjustment to exposure times associated with different types of frames (e.g., a first adjustment, which may include no adjustment, for short exposure frames and a second adjustment for long exposure frames), the device 105 may use a relatively high frames-per-second (fps), such as 120 fps, for receiving a set of video frames and may provide a constant, relatively lower fps, such as 30 fps, for outputting the set of video frames. In examples in which the device 105 uses 120 fps, the device 105 may set a first exposure time for short exposure frames to $1/120$ seconds (i.e., 8.3 milliseconds) and may set a second exposure time for long exposure frames to $3/120$ seconds (i.e., $1/40$ seconds or 25 milliseconds). As such, the device 105 may achieve a final fps of constant 30 fps (or approximately 30 fps, as $1/40$ seconds is close to $1/30$ seconds). In other words, such sensor timing allows the device 105 to minimize short exposure to 8.3 milliseconds, maximize long exposure to 25 milliseconds, and the timing may be for 120 fps but the sensor actually streams at 60 fps and a final, visible frame rate is 30 fps.

In other words, the device 200 may use a native, relatively high frame rate mode, such as 120 fps or more and, in high light conditions (e.g., such as if a scene brightness is relatively high), the device 200 may throttle down the fps to 30 fps by using the sensor blanking to pad the sensor frame time. The device 200 may perform similar or the same actions in low light conditions. The device 200 may use up to $3/120$ seconds or $1/40$ seconds for a first frame and implement a long exposure and may use up to $1/120$ seconds for a second frame and implement a short exposure. This may bring the long exposure time to $1/40$ seconds, which is approximately the $1/30$ seconds from (e.g., associated with) a normal 30 fps mode.

Additionally or alternatively, the device 105 may drop or reduce an fps in low light conditions based on allocating extra or additional time to long exposure (and refraining from allocating any extra or additional time to short exposure). In some implementations, the device 105 may use 60 fps to provide 30 fps in high light conditions and 15 fps in low light conditions. In high light conditions, for example, the device 105 may set both short and long exposures to have $1/60$ seconds each, such that $1/60+1/60=1/30$, or 30 fps. Alternatively, in low light conditions, the device 105 may set short exposure to $1/60$ seconds and set long exposure to $3/60$ seconds, such that $1/60+3/60=1/15$, or 15 fps.

In other words, the device 200 may decrease a frame rate in an asymmetrical way. For example, if the device 200 drops a final fps to some number, such as $1/24$ seconds=24 fps, the device 200 may increase the long exposure maximum or upper limit time from $1/60$ seconds to $1/40$ seconds while keeping the short exposure time to $1/60$ seconds. Such an asymmetrical frame time allocates the increased exposure (e.g., resulting from the reduction of the fps) to long exposures frames and may refrain from allocating any of the increased exposure to short exposure frames. In some aspects, the difference between an initial frame rate and the final frame rate may be referred to herein as a delta frame rate value. Accordingly, in some implementations, the device 200 may allocate a duration (e.g., a time duration) provided by the delta frame rate value to the exposure times associated with long exposure frames while refraining from allocating any of the duration provided by the delta frame rate value to exposure times associated with short exposure frames.

Such asymmetric exposure time adjustments for MF HDR smart low light fps may mitigate issues that result in low light conditions for MF HDR image processing. Further, in some implementations, the device 105 may achieve such asymmetric exposure time adjustments via asymmetrical blanking. For example, at a sensor of the device 105, the device 105 may add lines (e.g., blanking or padding lines) to a set of actual lines (e.g., visible lines) to give more time between the capture of one frame to the capture of the next frame. The device 200 may use some amount of minimum or lower limit blanking between the two frames, but may increase the blanking (e.g., from the minimum or lower limit) to increase the exposure time. Accordingly, in some implementations, the device 200 may add blanking or padding lines to the sensor for short exposure frames to increase the exposure time associated with the long exposure frames and may refrain from adding blanking or padding lines to the sensor for long exposure frames (or may add some relatively smaller amount of blanking or padding lines to the sensor for long exposure frames).

As described herein, and in the context of sensor timing, such as complementary metal oxide semiconductor (CMOS) sensor timing, the device 200 may use a particular unit of time that relates to an amount of time the sensor of the device 200 takes to read out one line. In other words, instead of using nanoseconds, microseconds, or seconds, the device 200 may use the time it takes to read out one line as a unit of time. The device 200 may use such a line readout-based unit of time because an image sensor of the device 200 may be or otherwise function as a state machine that performs some operation or output at teach "tick" of a clock. For example, the image sensor may output (or push out) a line of pixels at each "tick" of the clock, which makes a "line" become a handy unit of time. An image sensor may include a finite number of lines and the device 200 (or the image sensor of the device 200) may take some time to read out those lines. As such, a frame line length (which may be equivalently referred to herein as a sensor frame line length) may refer to a length of the lines that the image sensor may read or output for each frame and may be associated with some amount of time, where that amount of time is correlated with (or directly corresponds to) an exposure time for that frame or a subsequent frame.

Further, upon finishing reading out the lines for a first frame, the image sensor may move to reading the lines for a second, subsequent frame. As such, if the image sensor reads the lines of the first frame relatively quickly, pixels of the lines of the first frame may have a relatively small amount of time to be exposed to light (e.g., photons). Accordingly, in some implementations, the device 200 may increase exposure time for pixels of a frame by having the image sensor output lines that do not include real pixels of the frame, where such lines that do not include real pixels of the frame may be referred to as blanking or padding lines. Thus, if the device 200 adds a number of blanking or padding lines to the sensor for the first frame, pixels of the first or second frame may be exposed to light while the image sensor reads out the number of blanking or padding lines that are added for the first frame. The frame line length or the sensor frame line length includes a summation of the visible lines for that frame and the blanking lines added for that frame.

The various frame types described herein are described or referred to as short exposure frames and long exposure frames. Short exposure frames and long exposure frames may be defined relative to each other regarding an amount of time that pixels of a frame are exposed to or gather light. For example, short exposure frames may refer to frames for which pixels are exposed to light for a relatively shorter time duration than pixels of long exposure frames. In other words, the device 200 may expose pixels of short exposure frames to light for a first time duration (e.g., a first exposure time) and may expose pixels of long exposure frames to light for a second time duration (e.g., a second exposure time), where the first time duration is shorter than the second time duration. Various details relating to an image sensor processing of input frames and image sensing timing are described herein, including with reference to FIGS. 3 through 6.

Figure 3:
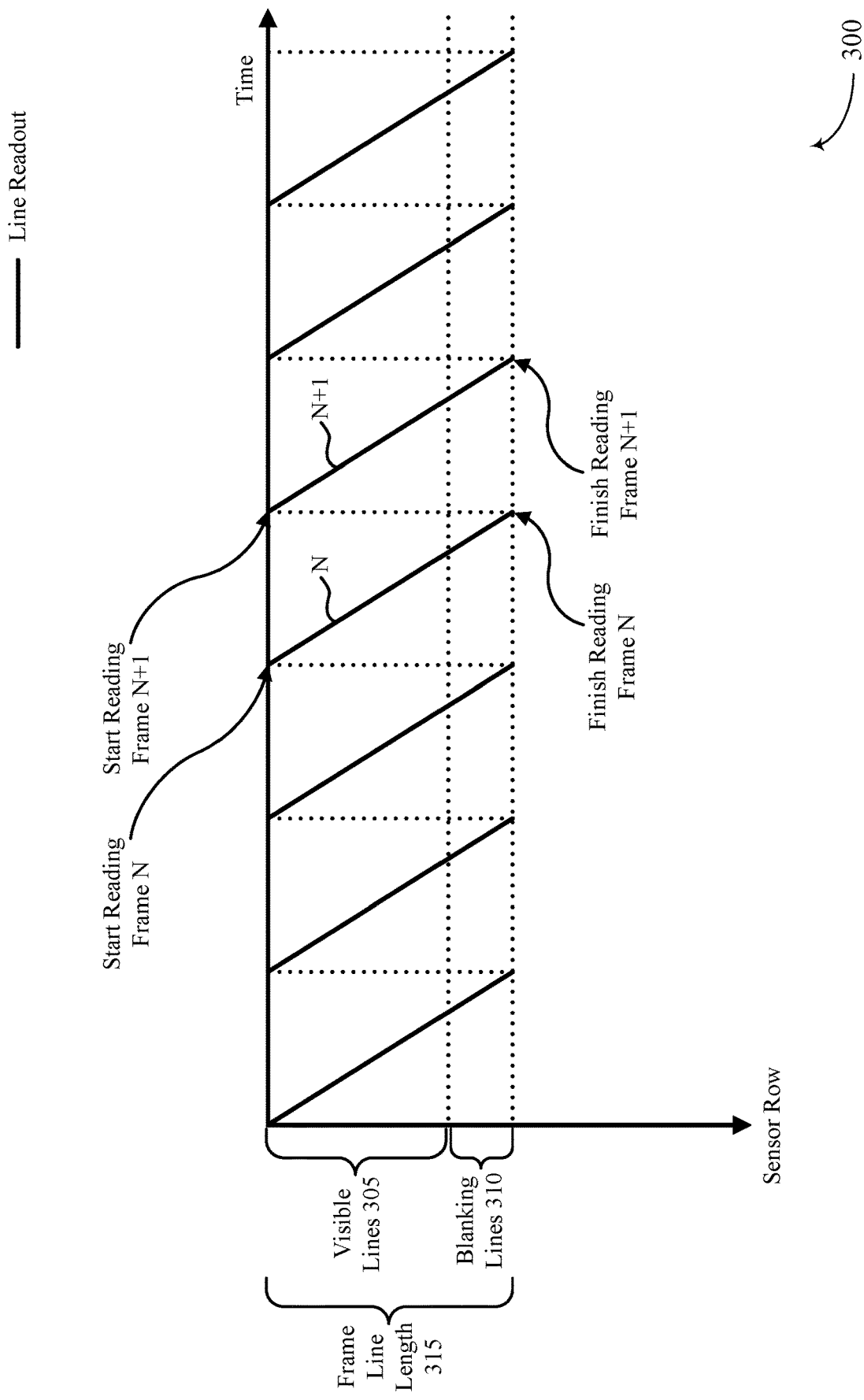
FIGS. 3 through 6 illustrate examples of sensing timing diagrams that support asymmetric exposure time adjustments for MF HDR imaging in low light conditions in accordance with aspects of the present disclosure.

FIG. 3 illustrates an example of a sensor timing diagram 300 that supports asymmetric exposure time adjustments for MF HDR imaging in low light conditions in accordance with aspects of the present disclosure. The sensor timing diagram 300 may implement or be implemented to realize aspects of the multimedia system 100. For example, a device 105 or a device 200 (as described with reference to FIG. 1 and FIG. 2, respectively) may perform one or more tasks associated with image processing in accordance with the sensor timing diagram 300.

The sensor timing diagram 300 may be an example of a line readout and line reset diagram illustrating how an image sensor of a device outputs or reads out lines for each of a number of frames over time. Each frame may be associated with a set of lines including a set of one or more visible lines 305 (e.g., real lines, or lines that include actual pixels of that frame) and a set of one or more blanking lines 310, which together may sum to a frame line length 315, on a sensor row axis and the image sensor may output or readout each set of lines over an amount of time as illustrated by the time axis. In some aspects, the set of one or more blanking lines 310 may include a minimum or lower limit amount of blanking lines 310 that the image sensor adds for each frame.

As shown in FIG. 3, the image sensor of the device may start reading lines of a frame N at a first time and may finish reading lines of frame N at a second time. The time duration between the first time at which the image sensor starts reading frame N and the second time at which the image sensor finishes reading frame N may be associated with an amount of time that the image sensor takes to read a frame line length 315 of the frame N. Similarly, the image sensor of the device may start reading lines of a frame N+1 at the second time (based, in part, on state machine functionality) and may finish reading lines of frame N+1 at a third time. The time duration between the second time at which the image sensor starts reading frame N+1 and the third time at which the image sensor finishes reading frame N+1 may be associated with an amount of time that the image sensor takes to read the frame line length 315 of the frame N+1.

Figure 4:
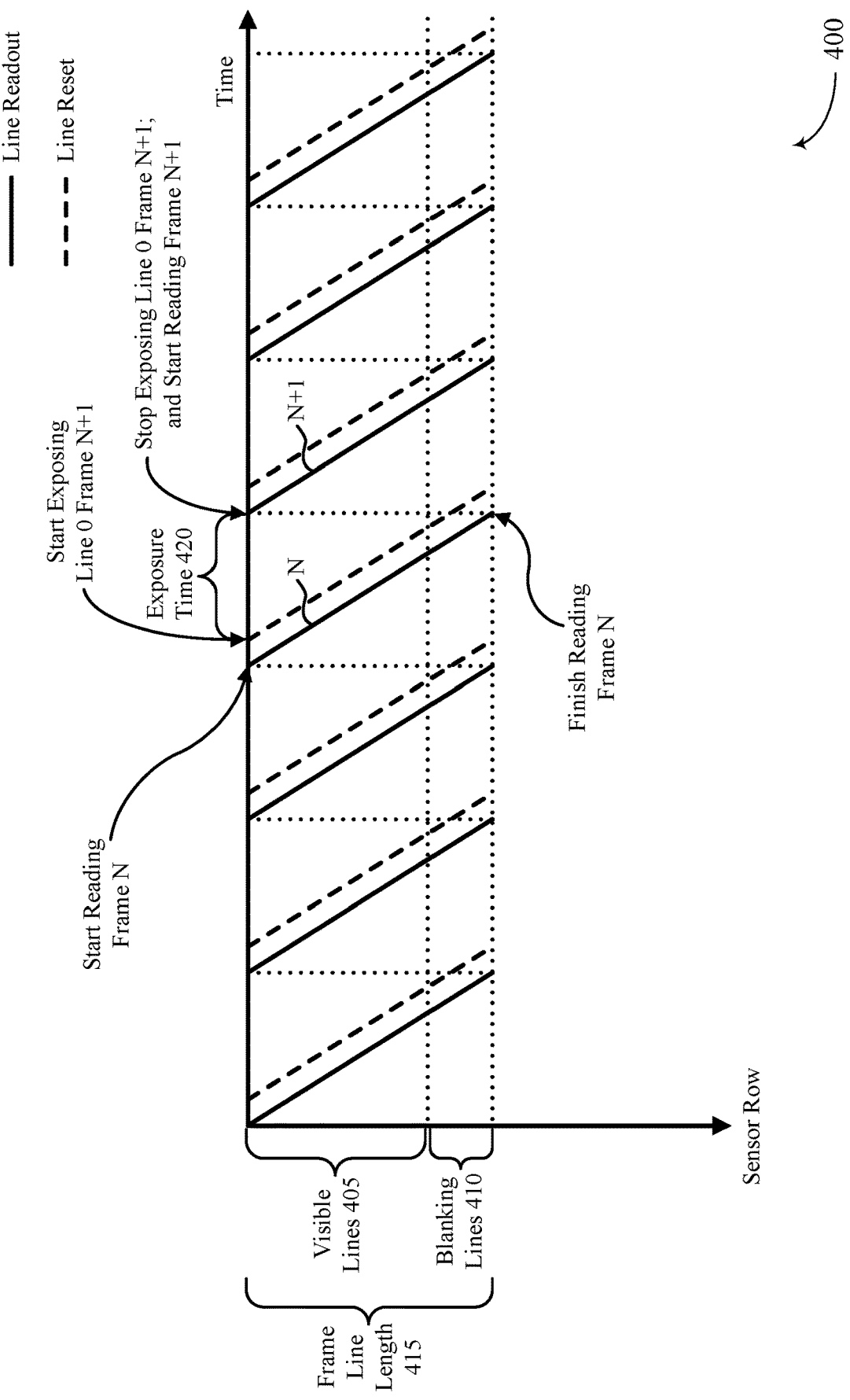

FIG. 4 illustrates an example of a sensor timing diagram 400 that supports asymmetric exposure time adjustments for MF HDR imaging in low light conditions in accordance with aspects of the present disclosure. The sensor timing diagram 400 may implement or be implemented to realize aspects of the multimedia system 100. For example, a device 105 or a device 200 (as described with reference to FIG. 1 and FIG. 2, respectively) may perform one or more tasks associated with image processing in accordance with the sensor timing diagram 400.

The sensor timing diagram 400 may be an example of a line readout and line reset diagram illustrating how an image sensor of a device outputs or reads out lines for each of a number of frames over time. Each frame may be associated with a set of lines including a set of one or more visible lines 405 (e.g., real lines, or lines that include actual pixels of that frame) and a set of one or more blanking lines 410, which together may sum to a frame line length 415, on a sensor row axis and the image sensor may output or readout each set of lines over an amount of time as illustrated by the time axis. In some aspects, the set of one or more blanking lines 410 may include a minimum or lower limit amount of blanking lines 410 that the image sensor adds for each frame.

As shown in FIG. 4, the image sensor of the device may start reading lines of a frame N at a first time, may start exposing a first line (e.g., line 0) of a frame N+1 at a second time, and may finish reading lines of frame N at a third time. The image sensor also may start reading lines of the frame N+1 and stop exposing the first line (e.g., the line 0) of the frame N+1 at the third time. The image sensor may similarly start and stop exposing each line of the frame N+1 in accordance with the line readouts and line resets of the frame N and the frame N+1 such that each line of the frame N+1 is associated with an exposure time 420. In accordance with the exposures of the sensor timing diagram 400, each frame of the set of frames may be associated with a same exposure time.

Figure 5:
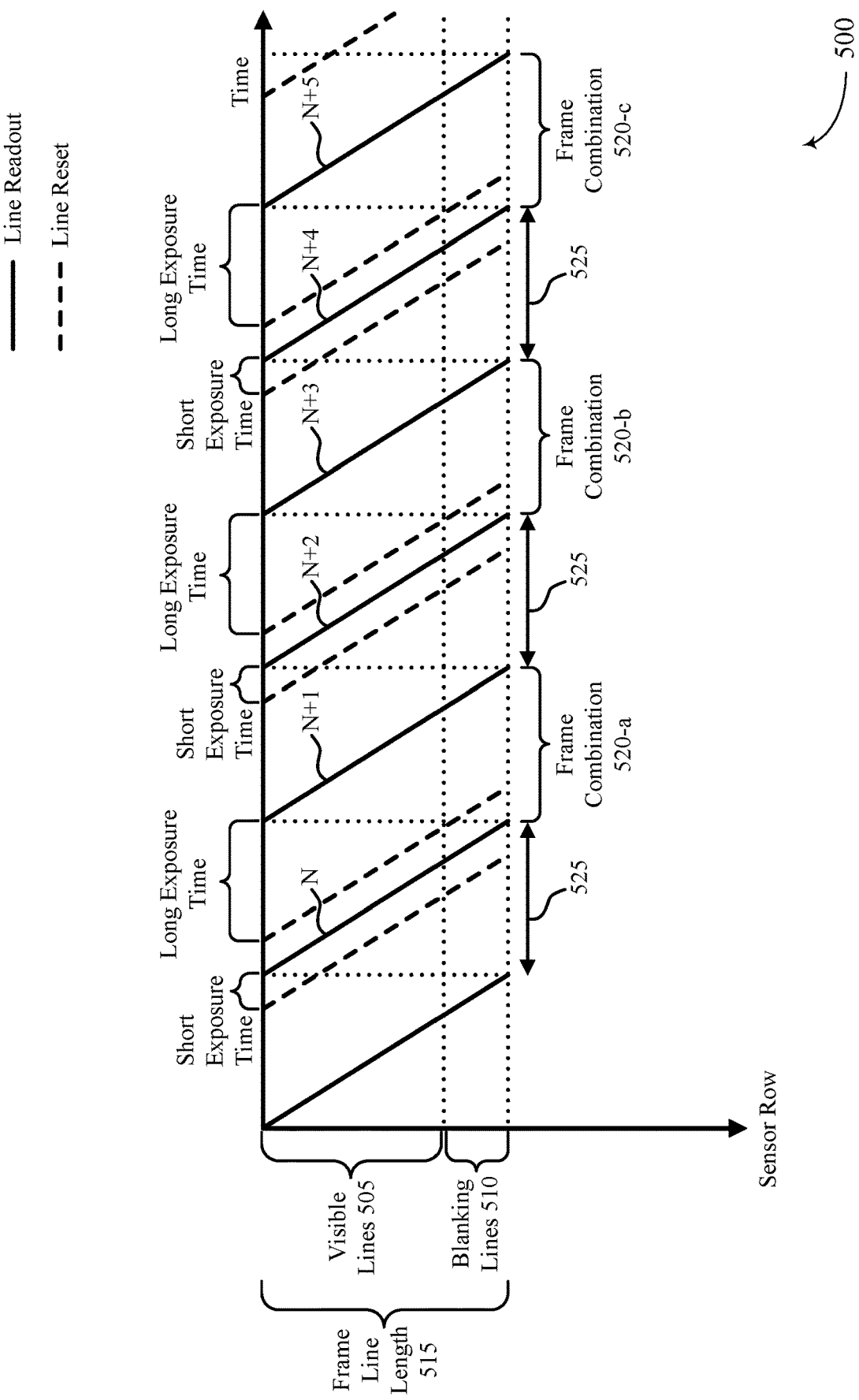

FIG. 5 illustrates an example of a sensor timing diagram 500 that supports asymmetric exposure time adjustments for MF HDR imaging in low light conditions in accordance with aspects of the present disclosure. The sensor timing diagram 500 may implement or be implemented to realize aspects of the multimedia system 100. For example, a device 105 or a device 200 (as described with reference to FIG. 1 and FIG. 2, respectively) may perform one or more tasks associated with image processing in accordance with the sensor timing diagram 500.

The sensor timing diagram 500 may be an example of a line readout and line reset diagram for MF HDR image processing illustrating how an image sensor of a device outputs or reads out lines for each of a number of frames over time. The number of frames may include a first subset of frames associated with a short exposure time and a second subset of frames associated with a long exposure time. Each frame may be associated with a set of lines including a set of one or more visible lines 505 (e.g., real lines, or lines that include actual pixels of that frame) and a set of one or more blanking lines 510, which together may sum to a frame line length 515, on a sensor row axis and the image sensor may output or readout each set of lines over an amount of time as illustrated by the time axis. In some aspects, the set of one or more blanking lines 510 may include a minimum or lower limit amount of blanking lines 510 that the image sensor adds for each frame.

As shown in FIG. 5, MF HDR image processing may include varying exposure times for different types of frames, including a short exposure time for short exposure frames and long exposure times for long exposure frames. In some examples, and as also shown in FIG. 5, the varying exposure times for different types of frames may be based on variation in a timing associated with line resets. Further, and in accordance with MF HDR image processing, an image sensor or a device including the image sensor may combine two frames, such as a short exposure frame and a long exposure frame, into one frame combination 520. For example, the image sensor or the device may combine a frame N (e.g., a first short exposure frame) and a frame N+1 (e.g., a first long exposure frame) to obtain a frame combination 520-a, may combine a frame N+2 (e.g., a second short exposure frame) and a frame N+3 (e.g., a second long exposure frame) to obtain a frame combination 520-b, and may combine a frame N+4 (e.g., a third short exposure frame) and a frame N+5 (e.g., a third long exposure frame) to obtain a frame combination 520-c. As the image sensor or the device combines two frames into one frame, a final frame rate may be a sum of the two frame times (e.g., final frame rate=short exposure time+long exposure time).

In some cases, the image sensor may include a same amount of blanking lines 510 for each frame regardless of frame type. For example, the image sensor may add the set of one or more blanking lines 510 for both long exposure frames and short exposure frames. In some conditions (e.g., such as in low light conditions), however, an even longer exposure time for long exposure frames may be more suitable for providing a high quality image, but a time duration 525 between long exposure frames and short exposure frames may get in the way of increasing the long exposure times associated with the long exposure frames. For example, the image sensor or the device may be unable to "take away" time from the readouts for the short exposure frames, which may limit the long exposure time available for long exposure frames, even though it may be more suitable for the image sensor or the device to reduce short exposure time and increase long exposure time, with similarity to super HDR (SHDR), in some light conditions (e.g., low light conditions). In some implementations, based on detecting a light condition, the image sensor or the device may increase the exposure time associated with the long exposure frames based on adding more blanking lines to the sensor row for the long exposure frames (and may refrain from adding more blanking lines to the sensor row for the short exposure frames), as illustrated by and described in more detail herein, including with reference to FIG. 6.

Figure 6:
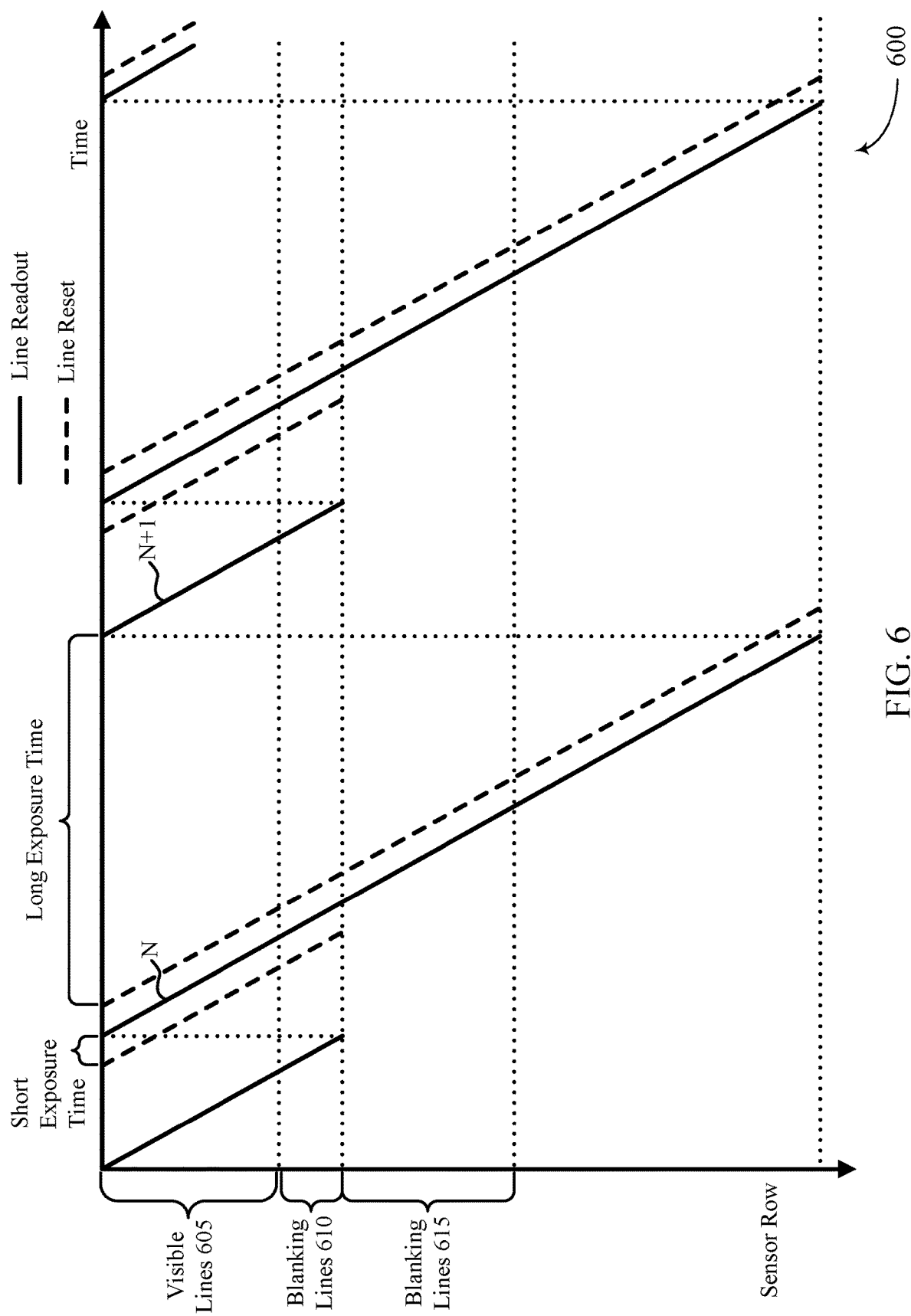

FIG. 6 illustrates an example of a sensor timing diagram 600 that supports asymmetric exposure time adjustments for MF HDR imaging in low light conditions in accordance with aspects of the present disclosure. The sensor timing diagram 600 may implement or be implemented to realize aspects of the multimedia system 100. For example, a device 105 or a device 200 (as described with reference to FIG. 1 and FIG. 2, respectively) may perform one or more tasks associated with image processing in accordance with the sensor timing diagram 600.

The sensor timing diagram 600 may be an example of a line readout and line reset diagram for MF HDR image processing illustrating how an image sensor of a device outputs or reads out lines for each of a number of frames over time. As shown in FIG. 6, a device (e.g., or an image sensor of the device) may receive a set of frames including a first subset of frames associated with a short exposure time and a second subset of frames associated with a long exposure time. Accordingly, the first subset of frames may be referred to herein as short exposure frames and the second subset of frames may be referred to herein as long exposure frames. As also shown in FIG. 6, the device may add a first number of blanking lines to add exposure time for the short exposure frames and may add a second, greater number of blanking lines to add a relatively greater exposure time for the long exposure frames based on detecting a light condition, such as a low light condition.

For example, the long exposure frames may be associated with a set of one or more visible lines 605 and a set of one or more blanking lines 610 and, to increase the exposure time for the long exposure frames, the short exposure frames may be associated with the set of one or more visible lines 605, the set of one or more blanking lines 610, and a set of one or more blanking lines 615. As such, the device 105 may spend a relatively longer duration "reading" a frame N (e.g., a short exposure frame) to provide a greater amount of time for exposure of pixels of a frame N+1 (e.g., a long exposure frame) to light (e.g., as long as exposure time is less than an amount of time to readout the lines for a given frame). Such use of different amounts of blanking lines to facilitate longer exposure times for long exposure frames in low light conditions may be referred to herein as asymmetrical blanking, such that short blanking is less than long blanking. For example, long exposure frames may be associated with a relatively longer frame time while other frames (e.g., short exposure frames) may stay the same in low light conditions. Further, based on such asymmetrical blanking, frame readout times may alternate.

Figure 7:
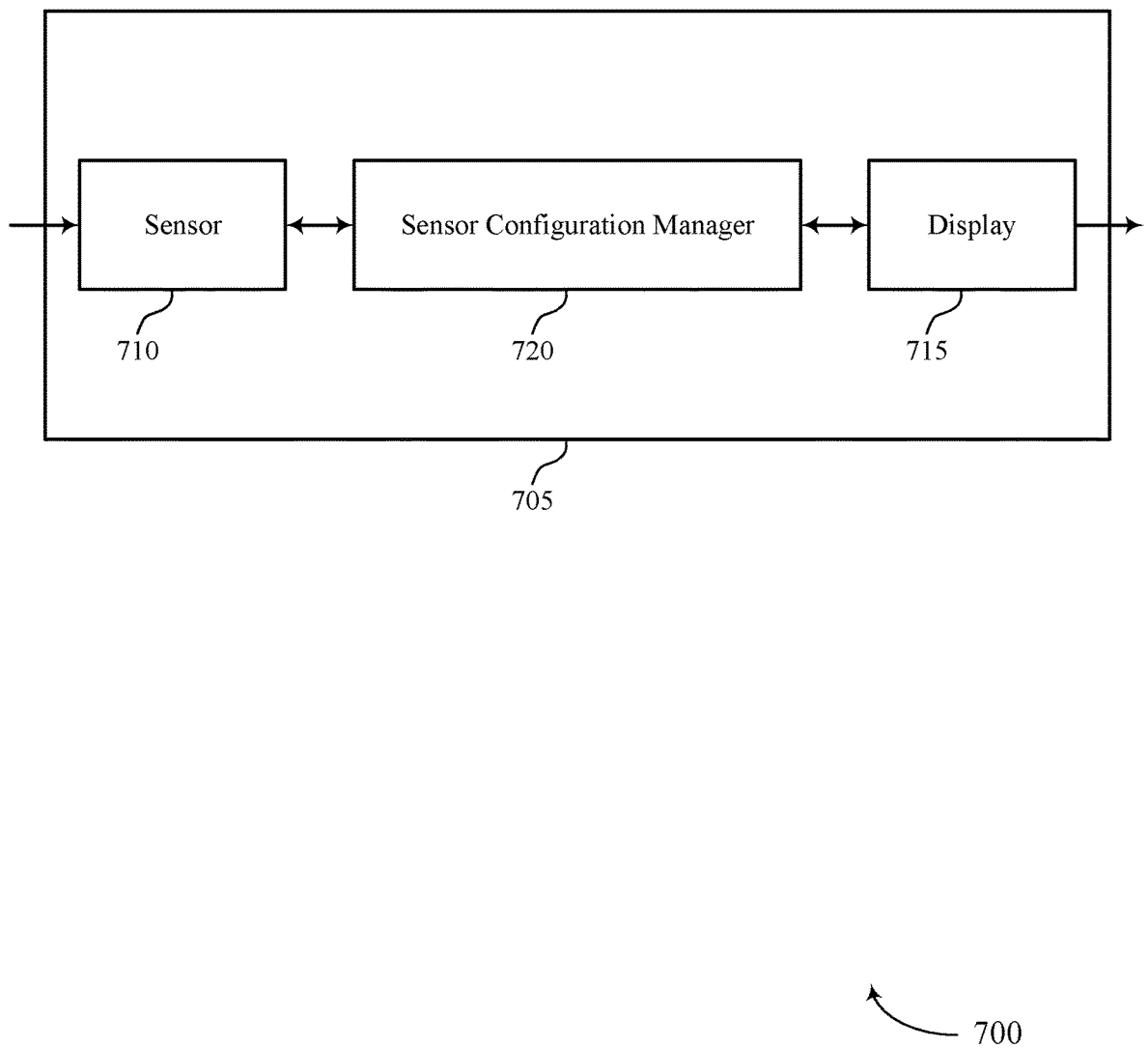
FIGS. 7 and 8 show block diagrams of devices that support asymmetric exposure time adjustments for MF HDR imaging in low light conditions in accordance with aspects of the present disclosure.

FIG. 7 shows a block diagram 700 of a device 705 that supports asymmetric exposure time adjustments for MF HDR imaging in low light conditions in accordance with aspects of the present disclosure. The device 705 may be an example of aspects of a Camera Device as described herein. The device 705 may include a sensor 710, a display 715, and a sensor configuration manager 720. The device 705 may also include a processor. Each of these components may be in communication with one another (e.g., via one or more buses).

The one or more sensors 710 (e.g., image sensors, cameras, etc.) may receive information (e.g., light, for example, visible light or invisible light), which may be passed on to other components of the device 705. In some cases, the sensors 710 may be an example of aspects of the input/output (I/O) controller 1010 described with reference to FIG. 10. A sensor 710 may utilize one or more photosensitive elements that have a sensitivity to a spectrum of electromagnetic radiation to receive information (e.g., a sensor 710 may be configured or tuned to receive a pixel intensity value, red green blue (RGB) values, infrared (IR) light values, near-IR light values, ultraviolet (UV) light values of a pixel, etc.). The information may then be passed on to other components of the device 705.

The display 715 may display content generated by other components of the device. The display 715 may be an example of display 1030 as described with reference to FIG. 10. In some examples, the display 1030 may be connected with a display buffer which stores rendered data until an image is ready to be displayed (e.g., as described with reference to FIG. 10). The display 715 may illuminate according to signals or information generated by other components of the device 705. For example, the display 715 may receive display information (e.g., pixel mappings, display adjustments) from sensor 710, and may illuminate accordingly. The display 715 may represent a unit capable of displaying video, images, text or any other type of data for consumption by a viewer. The display 715 may include a liquid-crystal display (LCD), a light emitting diode (LED) display, an organic LED (OLED), an active-matrix OLED (AMOLED), or the like.

In some cases, the display 715 and an I/O controller (e.g., I/O controller 1010) may be or represent aspects of a same component (e.g., a touchscreen) of the device 705. The display 715 may be any suitable display or screen allowing for user interaction or allowing for presentation of information (such as captured images and video) for viewing by a user. In some aspects, the display 715 may be a touch-sensitive display. In some cases, the display 715 may display images captured by sensors, where the displayed images that are captured by sensors may depend on the configuration of light sources and active sensors by the sensor configuration manager 720.

The sensor configuration manager 720, the sensor 710, the display 715, or various combinations thereof or various components thereof may be examples of means for performing various aspects of asymmetric exposure time adjustments for MF HDR imaging in low light conditions as described herein. For example, the sensor configuration manager 720, the sensor 710, the display 715, or various combinations or components thereof may support a method for performing one or more of the functions described herein.

In some examples, the sensor configuration manager 720, the sensor 710, the display 715, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the sensor configuration manager 720, the sensor 710, the display 715, or various combinations or components thereof may be implemented in code (e.g., as communications management software or firmware) executed by a processor. If implemented in code executed by a processor, the functions of the sensor configuration manager 720, the sensor 710, the display 715, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the sensor configuration manager 720 may be configured to perform various operations (e.g., receiving, monitoring, transmitting) using or otherwise in cooperation with the sensor 710, the display 715, or both. For example, the sensor configuration manager 720 may receive information from the sensor 710, send information to the display 715, or be integrated in combination with the sensor 710, the display 715, or both to receive information, transmit information, or perform various other operations as described herein.

The sensor configuration manager 720 may support image processing at a device in accordance with examples as disclosed herein. For example, the sensor configuration manager 720 may be configured as or otherwise support a means for receiving a set of video frames at a first frame rate, the set of video frames including a first subset of frames associated with a first exposure time and a second subset of frames associated with a second exposure time. The sensor configuration manager 720 may be configured as or otherwise support a means for adjusting the second exposure time associated with the second subset of frames. The sensor configuration manager 720 may be configured as or otherwise support a means for determining a third exposure time for the second subset of frames based on adjusting the second exposure time associated with the second subset of frames. The sensor configuration manager 720 may be configured as or otherwise support a means for outputting the set of video frames at a second frame rate based on the first exposure time for the first subset of frames and the third exposure time for the second subset of frames.

By including or configuring the sensor configuration manager 720 in accordance with examples as described herein, the device 705 (e.g., a processor controlling or otherwise coupled to the sensor 710, the display 715, the sensor configuration manager 720, or a combination thereof) may support techniques for reduced processing, reduced power consumption, and more efficient utilization of processing resources.

Figure 8:
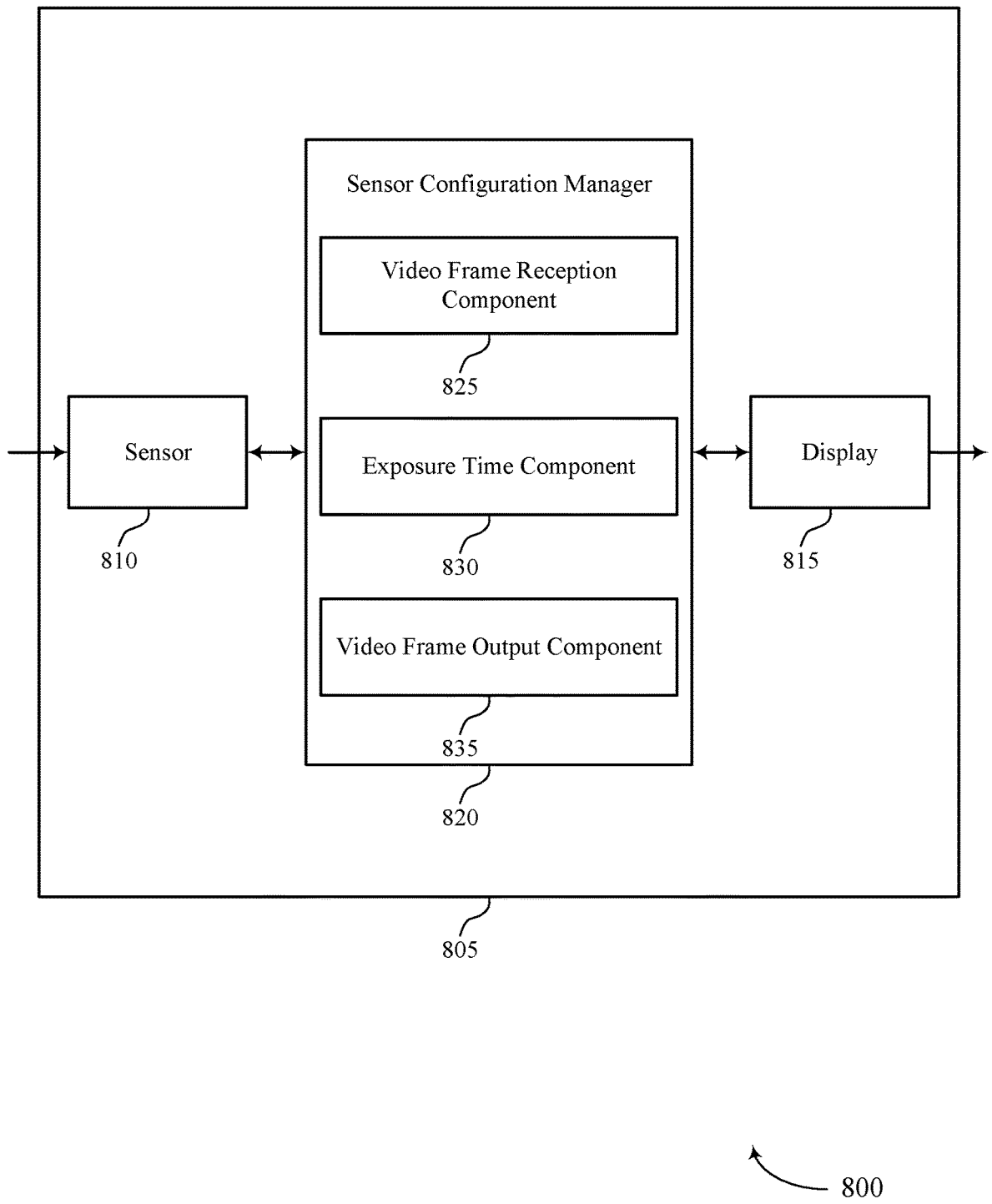

FIG. 8 shows a block diagram 800 of a device 805 that supports asymmetric exposure time adjustments for MF HDR imaging in low light conditions in accordance with aspects of the present disclosure. The device 805 may be an example of aspects of a device 705 or a device 105 (e.g., a camera device) as described herein. The device 805 may include a sensor 810, a display 815, and a sensor configuration manager 820. The device 805 may also include a processor. Each of these components may be in communication with one another (e.g., via one or more buses).

The one or more sensors 810 (e.g., image sensors, cameras, etc.) may receive information (e.g., light, for example, visible light or invisible light), which may be passed on to other components of the device 805. In some cases, the sensors 810 may be an example of aspects of the I/O controller 1010 described with reference to FIG. 10. A sensor 810 may utilize one or more photosensitive elements that have a sensitivity to a spectrum of electromagnetic radiation to receive information (e.g., a sensor 810 may be configured or tuned to receive a pixel intensity value, RGB values, IR light values, near-IR light values, UV light values of a pixel, etc.). The information may then be passed on to other components of the device 805.

The display 815 may display content generated by other components of the device. The display 815 may be an example of display 1030 as described with reference to FIG. 10. In some examples, the display 1030 may be connected with a display buffer which stores rendered data until an image is ready to be displayed (e.g., as described with reference to FIG. 10). The display 815 may illuminate according to signals or information generated by other components of the device 805. For example, the display 815 may receive display information (e.g., pixel mappings, display adjustments) from the sensor 810, and may illuminate accordingly. The display 815 may represent a unit capable of displaying video, images, text or any other type of data for consumption by a viewer.

The display 815 may include a LCD, a LED display, an OLED, an AMOLED, or the like. In some cases, the display 815 and an I/O controller (e.g., I/O controller 1010) may be or represent aspects of a same component (e.g., a touchscreen) of the device 805. The display 815 may be any suitable display or screen allowing for user interaction or allowing for presentation of information (such as captured images and video) for viewing by a user. In some aspects, the display 815 may be a touch-sensitive display. In some cases, the display 815 may display images captured by sensors, where the displayed images that are captured by sensors may depend on the configuration of light sources and active sensors by the sensor configuration manager 820.

The device 805, or various components thereof, may be an example of means for performing various aspects of asymmetric exposure time adjustments for MF HDR imaging in low light conditions as described herein. For example, the sensor configuration manager 820 may include a video frame reception component 825, an exposure time component 830, a video frame output component 835, or any combination thereof. The sensor configuration manager 820 may be an example of aspects of a sensor configuration manager 720 as described herein. In some examples, the sensor configuration manager 820, or various components thereof, may be configured to perform various operations (e.g., receiving, monitoring, transmitting) using or otherwise in cooperation with the sensor 810, the display 815, or both. For example, the sensor configuration manager 820 may receive information from the sensor 810, send information to the display 815, or be integrated in combination with the sensor 810, the display 815, or both to receive information, transmit information, or perform various other operations as described herein.

The sensor configuration manager 820 may support image processing at the device 805 in accordance with examples as disclosed herein. The video frame reception component 825 may be configured as or otherwise support a means for receiving a set of video frames at a first frame rate, the set of video frames including a first subset of frames associated with a first exposure time and a second subset of frames associated with a second exposure time. The exposure time component 830 may be configured as or otherwise support a means for adjusting the second exposure time associated with the second subset of frames. The exposure time component 830 may be configured as or otherwise support a means for determining a third exposure time for the second subset of frames based on adjusting the second exposure time associated with the second subset of frames. The video frame output component 835 may be configured as or otherwise support a means for outputting the set of video frames at a second frame rate based on the first exposure time for the first subset of frames and the third exposure time for the second subset of frames.

Figure 9:
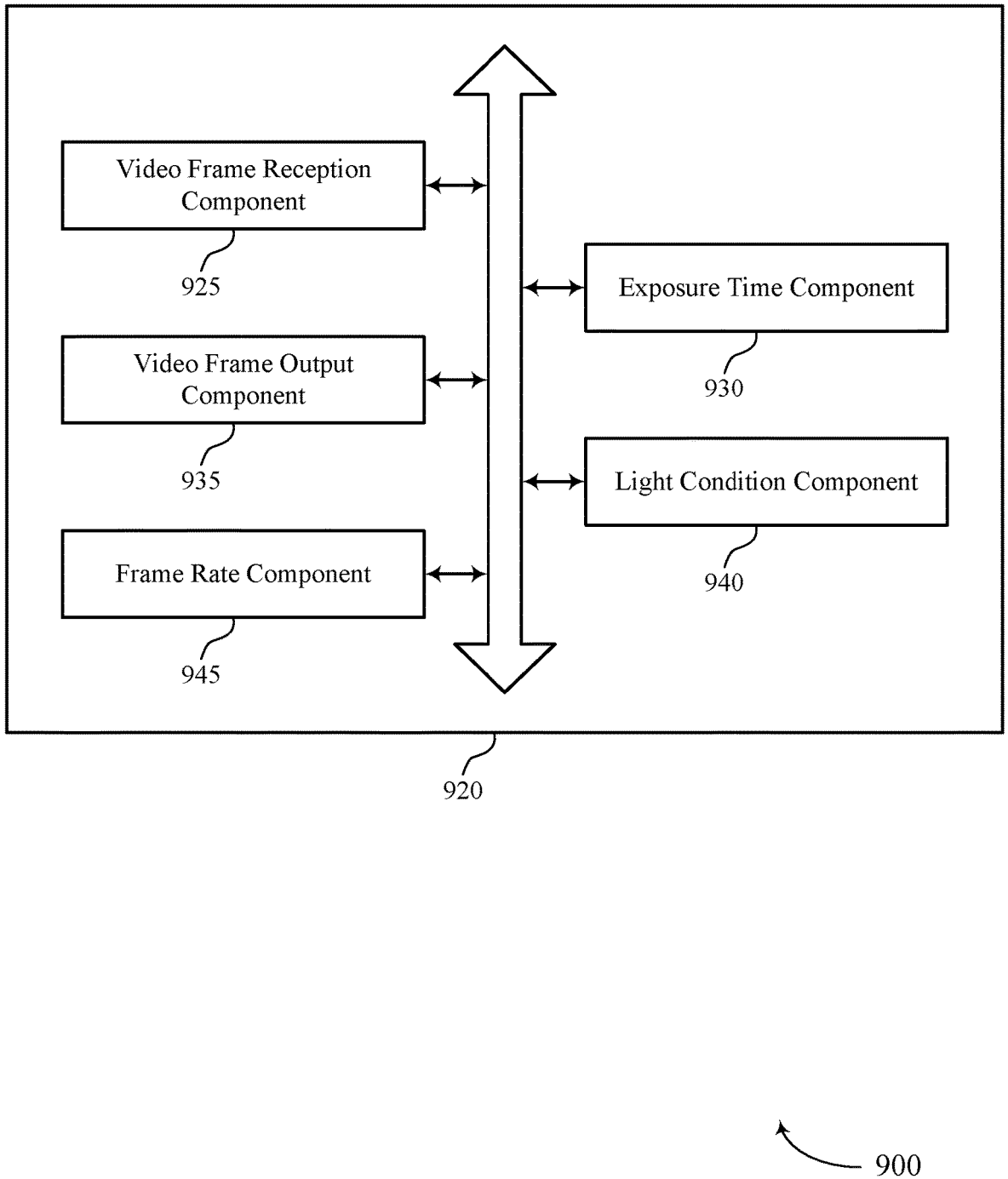
FIG. 9 shows a block diagram of a sensor configuration manager that supports asymmetric exposure time adjustments for MF HDR imaging in low light conditions in accordance with aspects of the present disclosure.

FIG. 9 shows a block diagram 900 of a sensor configuration manager 920 that supports asymmetric exposure time adjustments for MF HDR imaging in low light conditions in accordance with aspects of the present disclosure. The sensor configuration manager 920 may be an example of aspects of a sensor configuration manager 720, a sensor configuration manager 820, or both, as described herein. The sensor configuration manager 920, or various components thereof, may be an example of means for performing various aspects of asymmetric exposure time adjustments for MF HDR imaging in low light conditions as described herein.

For example, the sensor configuration manager 920 may include a video frame reception component 925, an exposure time component 930, a video frame output component 935, a light condition component 940, a frame rate component 945, or any combination thereof. Each of these components may communicate, directly or indirectly, with one another (e.g., via one or more buses).

The sensor configuration manager 920 may support image processing at a device in accordance with examples as disclosed herein. The video frame reception component 925 may be configured as or otherwise support a means for receiving a set of video frames at a first frame rate, the set of video frames including a first subset of frames associated with a first exposure time and a second subset of frames associated with a second exposure time. The exposure time component 930 may be configured as or otherwise support a means for adjusting the second exposure time associated with the second subset of frames. In some examples, the exposure time component 930 may be configured as or otherwise support a means for determining a third exposure time for the second subset of frames based on adjusting the second exposure time associated with the second subset of frames. The video frame output component 935 may be configured as or otherwise support a means for outputting the set of video frames at a second frame rate based on the first exposure time for the first subset of frames and the third exposure time for the second subset of frames.

In some examples, to support adjusting the second exposure time associated with the second subset of frames, the exposure time component 930 may be configured as or otherwise support a means for increasing a frame line length of an image sensor for the first subset of frames based on adding a set of blanking lines to a set of visible lines associated with the image sensor. In some examples, the light condition component 940 may be configured as or otherwise support a means for detecting a light condition associated with the set of video frames, the light condition indicating a low light condition associated with the set of video frames. In some examples, the exposure time component 930 may be configured as or otherwise support a means for adjusting the second exposure time associated with the second subset of frames based on detecting the light condition. In some examples, to support detecting the light condition, the light condition component 940 may be configured as or otherwise support a means for determining that a brightness level associated with the set of video frames satisfies a threshold.

In some examples, the frame rate component 945 may be configured as or otherwise support a means for decreasing the first frame rate by a delta frame rate value to obtain the second frame rate. In some examples, the exposure time component 930 may be configured as or otherwise support a means for allocating a duration provided by the delta frame rate value to the second exposure time associated with the second subset of frames to obtain the third exposure time. In some examples, the exposure time component 930 may be configured as or otherwise support a means for adjusting the second exposure time based on allocating the duration provided by the delta frame rate value to the second exposure time. In some examples, the exposure time component 930 may be configured as or otherwise support a means for refraining from allocating the duration provided by the delta frame rate value to the first exposure time associated with the first subset of frames. In some examples, the video frame output component 935 may be configured as or otherwise support a means for outputting the set of video frames at the second frame rate based on refraining from allocating the duration provided by the delta frame rate value to the first exposure time.

In some examples, the frame rate component 945 may be configured as or otherwise support a means for determining the second frame rate based on combining a first frame from the first subset of frames associated with the first exposure time and a second frame from the second subset of frames associated with the third exposure time. In some examples, the video frame output component 935 may be configured as or otherwise support a means for outputting the set of video frames at the second frame rate based on determining the second frame rate.

In some examples, to support adjusting the second exposure time associated with the second subset of frames, the exposure time component 930 may be configured as or otherwise support a means for increasing the second exposure time to obtain the third exposure time. In some examples, the first exposure time is equal to $1/120$ seconds, the third exposure time is equal to $3/120$ seconds, and the second frame rate is equal to 30 frames per second. In some examples, the first subset of frames include short exposure frames and the second subset of frames include long exposure frames.

Figure 10:
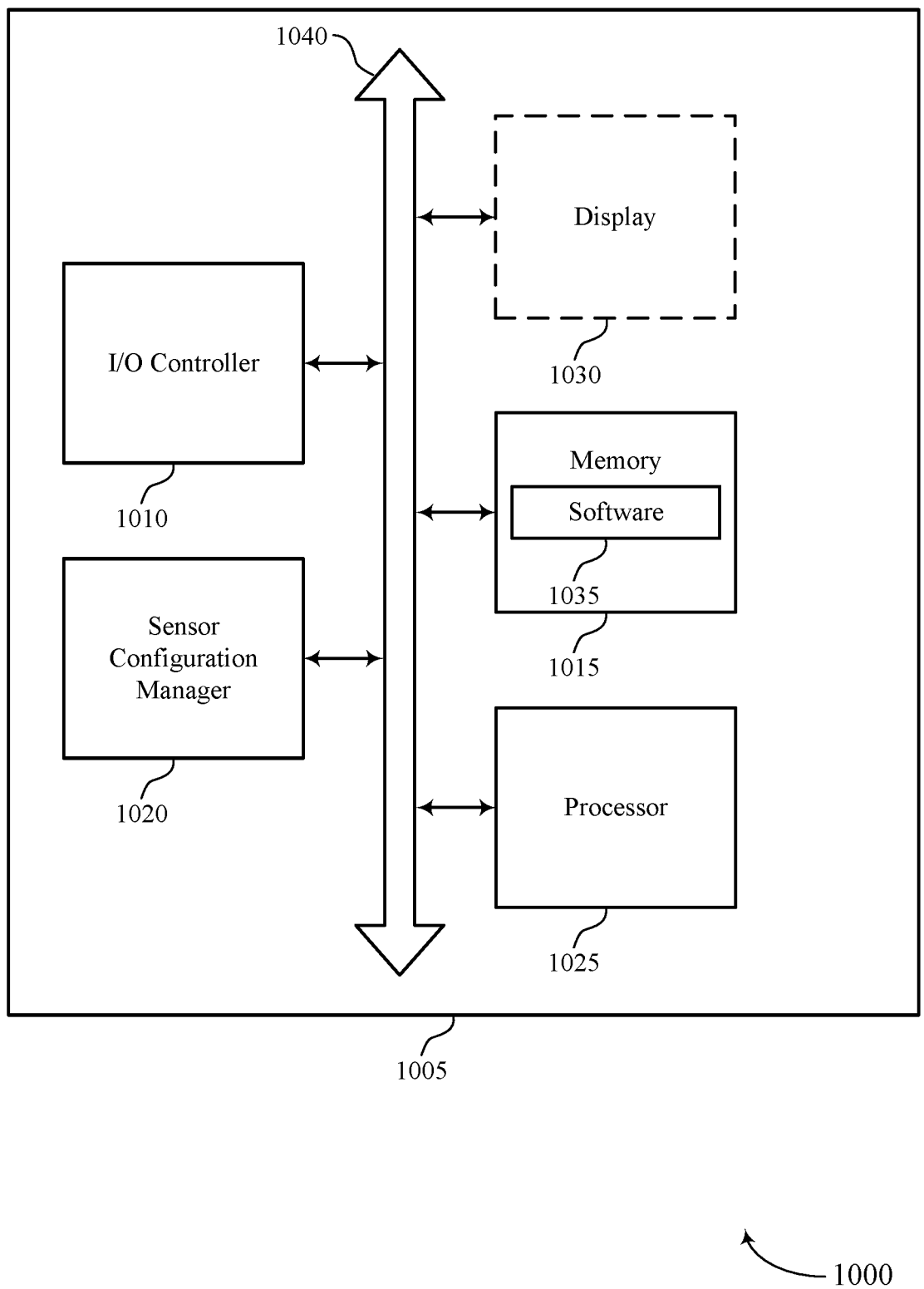
FIG. 10 shows a diagram of a system including a device that supports asymmetric exposure time adjustments for MF HDR imaging in low light conditions in accordance with aspects of the present disclosure.

FIG. 10 shows a diagram of a system 1000 including a device 1005 that supports asymmetric exposure time adjustments for MF HDR imaging in low light conditions in accordance with aspects of the present disclosure. The device 1005 may be an example of or include the components of a device 705, a device 805, or a device 105 as described herein. The device 1005 may include components for bi-directional voice and data communications including components for transmitting and receiving communications, such as a sensor configuration manager 1020, an I/O controller 1010, a memory 1015, a processor 1025, and a display 1030. These components may be in electronic communication or otherwise coupled (e.g., operatively, communicatively, functionally, electronically, electrically) via one or more buses (e.g., a bus 1040).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. In some other cases, the I/O controller 1010 may represent or interact with a modem, a keyboard, a mouse, a touchscreen, or a similar device. In some cases, the I/O controller 1010 may be implemented as part of a processor, such as the processor 1025. In some cases, a user may interact with the device 1005 via the I/O controller 1010 or via hardware components controlled by the I/O controller 1010.

The memory 1015 may include RAM and ROM. The memory 1015 may store computer-readable, computer-executable software 1035 (e.g., code) including instructions that, when executed by the processor 1025, cause the device 1005 to perform various functions described herein. The software 1035 (e.g., code) may be stored in a non-transitory computer-readable medium such as system memory or other type of memory. In some cases, the software 1035 (e.g., code) may not be directly executable by the processor 1025 but may cause a computer (e.g., when compiled and executed) to perform functions described herein. In some cases, the memory 1015 may contain, among other things, a basic I/O system (BIOS) which may control basic hardware or software operation such as the interaction with peripheral components or devices.

The processor 1025 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1025 may be configured to operate a memory array using a memory controller. In some other cases, a memory controller may be integrated into the processor 1025. The processor 1025 may be configured to execute computer-readable instructions stored in a memory (e.g., the memory 1015) to cause the device 1005 to perform various functions (e.g., functions or tasks supporting asymmetric exposure time adjustments for MF HDR imaging in low light conditions). For example, the device 1005 or a component of the device 1005 may include a processor 1025 and memory 1015 coupled to the processor 1025, the processor 1025 and memory 1015 configured to perform various functions described herein.

The device 1005 may include one or more light sources, which may include light sources capable of emitting visible light or invisible light. In some examples, the light sources may include a visible light source and an active invisible light source (e.g., IR light source, near-IR light source, UV light source). In some other examples, the one or more light sources may be associated with the display 1030.

The sensor configuration manager 1020 may support image processing at the device 1005 in accordance with examples as disclosed herein. For example, the sensor configuration manager 1020 may be configured as or otherwise support a means for receiving a set of video frames at a first frame rate, the set of video frames including a first subset of frames associated with a first exposure time and a second subset of frames associated with a second exposure time. The sensor configuration manager 1020 may be configured as or otherwise support a means for adjusting the second exposure time associated with the second subset of frames. The sensor configuration manager 1020 may be configured as or otherwise support a means for determining a third exposure time for the second subset of frames based on adjusting the second exposure time associated with the second subset of frames. The sensor configuration manager 1020 may be configured as or otherwise support a means for outputting the set of video frames at a second frame rate based on the first exposure time for the first subset of frames and the third exposure time for the second subset of frames.

By including or configuring the sensor configuration manager 1020 in accordance with examples as described herein, the device 1005 may support techniques for reduced latency, improved user experience related to reduced processing, reduced power consumption, more efficient utilization of processing resources, longer battery life, and improved utilization of processing capability.

The sensor configuration manager 1020, or its sub-components, may be implemented in hardware, code (e.g., software or firmware) executed by a processor, or any combination thereof. If implemented in code executed by a processor, the functions of the sensor configuration manager 1020, or its sub-components may be executed by a general-purpose processor, a DSP, an ASIC, a field programmable gate array (FPGA) or other programmable logic device, discrete gate or transistor logic, discrete hardware components, or any combination thereof designed to perform the functions described in the present disclosure. The sensor configuration manager 1020, or its sub-components, may be physically located at various positions, including being distributed such that portions of functions are implemented at different physical locations by one or more physical components. In some examples, the sensor configuration manager 1020, or its sub-components, may be a separate and distinct component in accordance with various aspects of the present disclosure. In some examples, the sensor configuration manager 1020, or its sub-components, may be combined with one or more other hardware components, including but not limited to an I/O component, a camera controller, another computing device, one or more other components described in the present disclosure, or a combination thereof in accordance with various aspects of the present disclosure.

Figure 11:
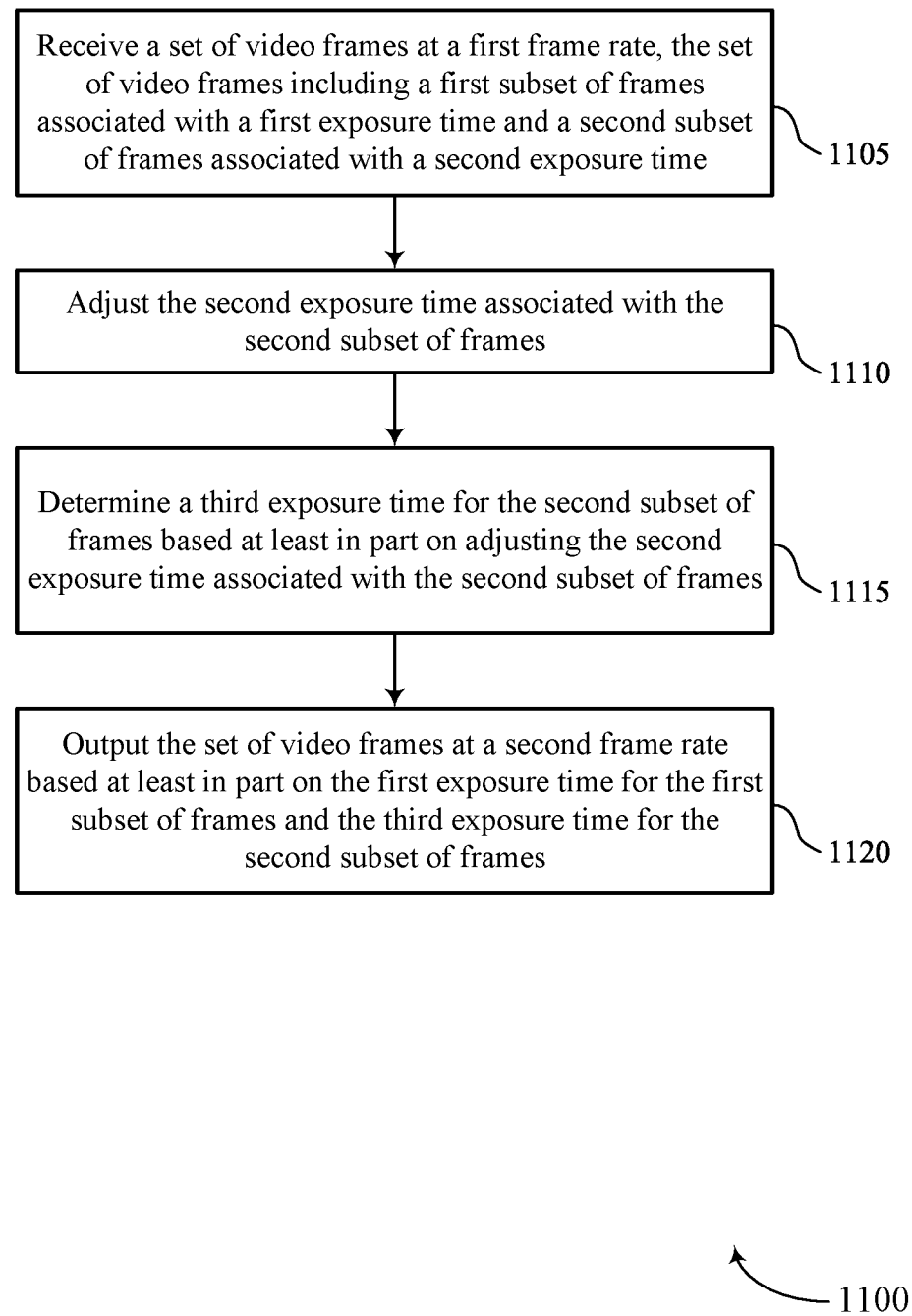
FIGS. 11 through 13 show flowcharts illustrating methods that support asymmetric exposure time adjustments for MF HDR imaging in low light conditions in accordance with aspects of the present disclosure.

FIG. 11 shows a flowchart illustrating a method 1100 that supports asymmetric exposure time adjustments for MF HDR imaging in low light conditions in accordance with aspects of the present disclosure. The operations of the method 1100 may be implemented by a device or its components as described herein. For example, the operations of the method 1100 may be performed by a device as described with reference to FIGS. 1 through 10. In some examples, a device may execute a set of instructions to control the functional elements of the device to perform the described functions. Additionally or alternatively, a device may perform aspects of the described functions using special-purpose hardware.

At 1105, the method may include receiving a set of video frames at a first frame rate, the set of video frames including a first subset of frames associated with a first exposure time and a second subset of frames associated with a second exposure time. The operations of 1105 may be performed in accordance with examples as disclosed herein. In some examples, aspects of the operations of 1105 may be performed by a video frame reception component 925 as described with reference to FIG. 9.

At 1110, the method may include adjusting the second exposure time associated with the second subset of frames. The operations of 1110 may be performed in accordance with examples as disclosed herein. In some examples, aspects of the operations of 1110 may be performed by an exposure time component 930 as described with reference to FIG. 9.

At 1115, the method may include determining a third exposure time for the second subset of frames based on adjusting the second exposure time associated with the second subset of frames. The operations of 1115 may be performed in accordance with examples as disclosed herein. In some examples, aspects of the operations of 1115 may be performed by an exposure time component 930 as described with reference to FIG. 9.

At 1120, the method may include outputting the set of video frames at a second frame rate based on the first exposure time for the first subset of frames and the third exposure time for the second subset of frames. The operations of 1120 may be performed in accordance with examples as disclosed herein. In some examples, aspects of the operations of 1120 may be performed by a video frame output component 935 as described with reference to FIG. 9.

Figure 12:
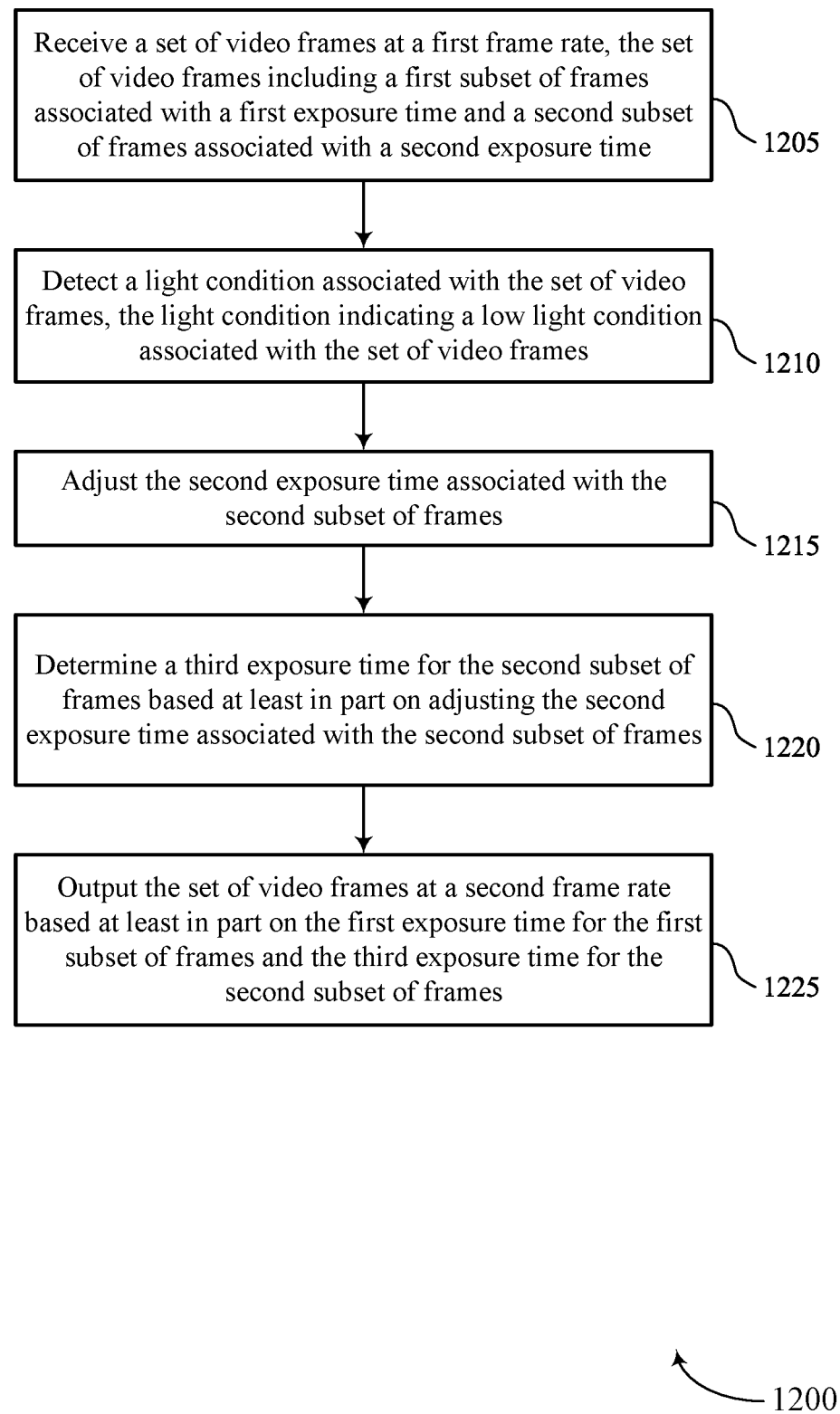

FIG. 12 shows a flowchart illustrating a method 1200 that supports asymmetric exposure time adjustments for MF HDR imaging in low light conditions in accordance with aspects of the present disclosure. The operations of the method 1200 may be implemented by a device or its components as described herein. For example, the operations of the method 1200 may be performed by a device as described with reference to FIGS. 1 through 10. In some examples, a device may execute a set of instructions to control the functional elements of the device to perform the described functions. Additionally or alternatively, a device may perform aspects of the described functions using special-purpose hardware.

At 1205, the method may include receiving a set of video frames at a first frame rate, the set of video frames including a first subset of frames associated with a first exposure time and a second subset of frames associated with a second exposure time. The operations of 1205 may be performed in accordance with examples as disclosed herein. In some examples, aspects of the operations of 1205 may be performed by a video frame reception component 925 as described with reference to FIG. 9.

At 1210, the method may include detecting a light condition associated with the set of video frames, the light condition indicating a low light condition associated with the set of video frames. The operations of 1210 may be performed in accordance with examples as disclosed herein. In some examples, aspects of the operations of 1210 may be performed by a light condition component 940 as described with reference to FIG. 9.

At 1215, the method may include adjusting the second exposure time associated with the second subset of frames. The operations of 1215 may be performed in accordance with examples as disclosed herein. In some examples, aspects of the operations of 1215 may be performed by an exposure time component 930 as described with reference to FIG. 9.

At 1220, the method may include determining a third exposure time for the second subset of frames based on adjusting the second exposure time associated with the second subset of frames. The operations of 1220 may be performed in accordance with examples as disclosed herein. In some examples, aspects of the operations of 1220 may be performed by an exposure time component 930 as described with reference to FIG. 9.

At 1225, the method may include outputting the set of video frames at a second frame rate based on the first exposure time for the first subset of frames and the third exposure time for the second subset of frames. The operations of 1225 may be performed in accordance with examples as disclosed herein. In some examples, aspects of the operations of 1225 may be performed by a video frame output component 935 as described with reference to FIG. 9.

Figure 13:
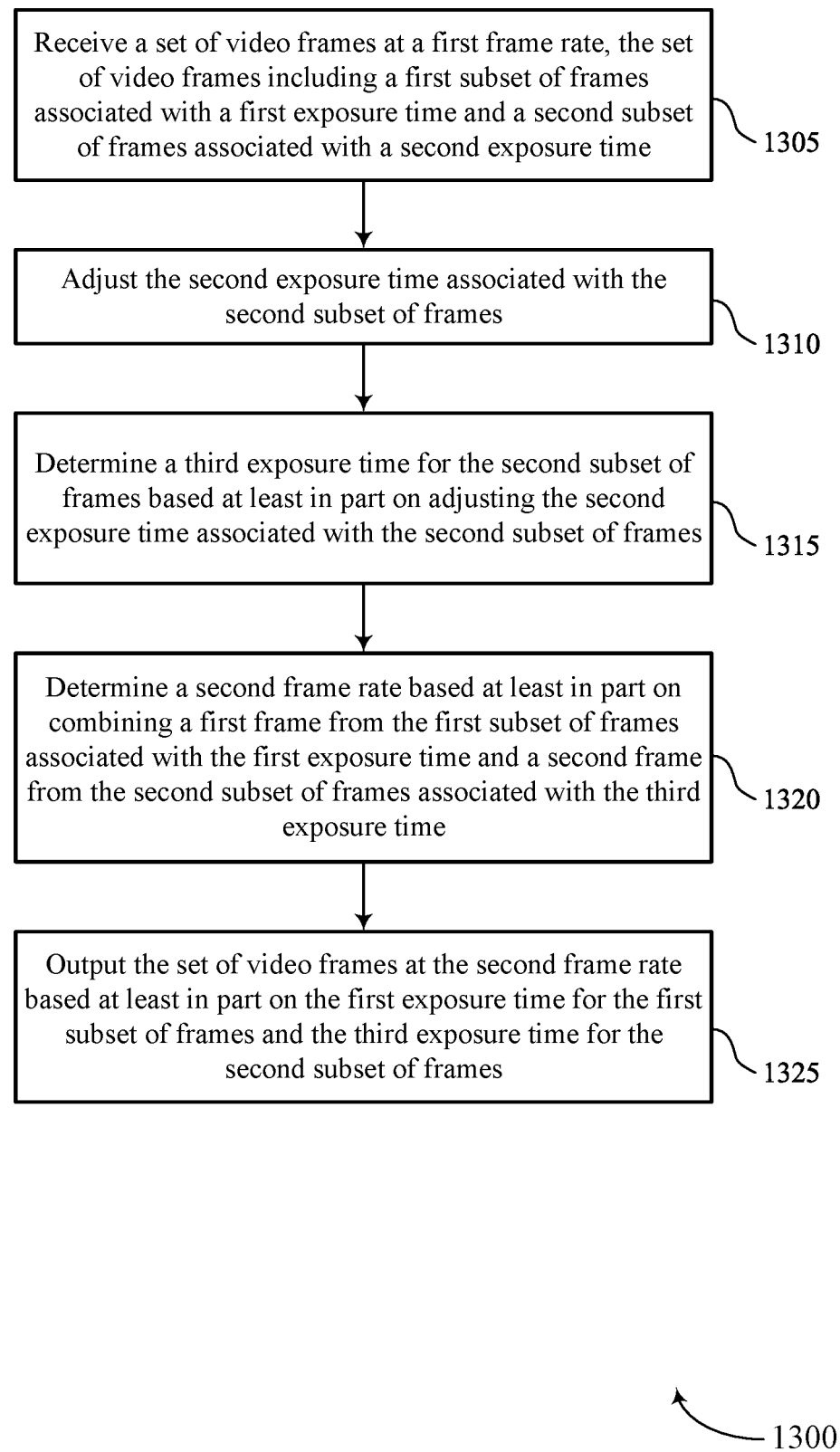

FIG. 13 shows a flowchart illustrating a method 1300 that supports asymmetric exposure time adjustments for MF HDR imaging in low light conditions in accordance with aspects of the present disclosure. The operations of the method 1300 may be implemented by a device or its components as described herein. For example, the operations of the method 1300 may be performed by a device as described with reference to FIGS. 1 through 10. In some examples, a device may execute a set of instructions to control the functional elements of the device to perform the described functions. Additionally or alternatively, a device may perform aspects of the described functions using special-purpose hardware.

At 1305, the method may include receiving a set of video frames at a first frame rate, the set of video frames including a first subset of frames associated with a first exposure time and a second subset of frames associated with a second exposure time. The operations of 1305 may be performed in accordance with examples as disclosed herein. In some examples, aspects of the operations of 1305 may be performed by a video frame reception component 925 as described with reference to FIG. 9.

At 1310, the method may include adjusting the second exposure time associated with the second subset of frames. The operations of 1310 may be performed in accordance with examples as disclosed herein. In some examples, aspects of the operations of 1310 may be performed by an exposure time component 930 as described with reference to FIG. 9.

At 1315, the method may include determining a third exposure time for the second subset of frames based on adjusting the second exposure time associated with the second subset of frames. The operations of 1315 may be performed in accordance with examples as disclosed herein. In some examples, aspects of the operations of 1315 may be performed by an exposure time component 930 as described with reference to FIG. 9.

At 1320, the method may include determining a second frame rate based on combining a first frame from the first subset of frames associated with the first exposure time and a second frame from the second subset of frames associated with the third exposure time. The operations of 1320 may be performed in accordance with examples as disclosed herein. In some examples, aspects of the operations of 1320 may be performed by a frame rate component 945 as described with reference to FIG. 9.

At 1325, the method may include outputting the set of video frames at the second frame rate based on the first exposure time for the first subset of frames and the third exposure time for the second subset of frames. The operations of 1325 may be performed in accordance with examples as disclosed herein. In some examples, aspects of the operations of 1325 may be performed by a video frame output component 935 as described with reference to FIG. 9.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, the term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for image processing at a device, comprising:
    receiving a set of video frames at a first frame rate, the set of video frames including a first subset of frames associated with a first exposure time and a second subset of frames associated with a second exposure time;
    adjusting the second exposure time associated with the second subset of frames;
    determining a third exposure time for the second subset of frames based at least in part on adjusting the second exposure time associated with the second subset of frames; and
    outputting the set of video frames at a second frame rate based at least in part on the first exposure time for the first subset of frames and the third exposure time for the second subset of frames.

2. The method of claim 1, wherein adjusting the second exposure time associated with the second subset of frames comprises:
    increasing a frame line length of an image sensor for the first subset of frames based at least in part on adding a set of blanking lines to a set of visible lines associated with the image sensor.

3. The method of claim 1, further comprising:
    detecting a light condition associated with the set of video frames, the light condition indicating a low light condition associated with the set of video frames,
    wherein adjusting the second exposure time associated with the second subset of frames is based at least in part on detecting the light condition.

4. The method of claim 3, wherein detecting the light condition comprises:
    determining that a brightness level associated with the set of video frames satisfies a threshold.

5. The method of claim 1, further comprising:
    decreasing the first frame rate by a delta frame rate value to obtain the second frame rate; and
    allocating a duration provided by the delta frame rate value to the second exposure time associated with the second subset of frames to obtain the third exposure time,
    wherein adjusting the second exposure time is based at least in part on allocating the duration provided by the delta frame rate value to the second exposure time.

6. The method of claim 5, further comprising:
    refraining from allocating the duration provided by the delta frame rate value to the first exposure time associated with the first subset of frames,
    wherein outputting the set of video frames at the second frame rate is based at least in part on refraining from allocating the duration provided by the delta frame rate value to the first exposure time.

7. The method of claim 1, further comprising:
    determining the second frame rate based at least in part on combining a first frame from the first subset of frames associated with the first exposure time and a second frame from the second subset of frames associated with the third exposure time,
    wherein outputting the set of video frames at the second frame rate based at least in part on determining the second frame rate.

8. The method of claim 1, wherein adjusting the second exposure time associated with the second subset of frames comprises:
    increasing the second exposure time to obtain the third exposure time.

9. The method of claim 1, wherein the first exposure time is equal to $1/120$ seconds, the third exposure time is equal to $3/120$ seconds, and the second frame rate is equal to 30 frames per second.

10. The method of claim 1, wherein the first subset of frames comprise short exposure frames and the second subset of frames comprise long exposure frames.

11. An apparatus for image processing at a device, comprising:
    a processor;
    memory coupled with the processor; and
    instructions stored in the memory and executable by the processor to cause the apparatus to:
        receive a set of video frames at a first frame rate, the set of video frames including a first subset of frames associated with a first exposure time and a second subset of frames associated with a second exposure time;
        adjust the second exposure time associated with the second subset of frames;
        determine a third exposure time for the second subset of frames based at least in part on adjusting the second exposure time associated with the second subset of frames; and
        output the set of video frames at a second frame rate based at least in part on the first exposure time for the first subset of frames and the third exposure time for the second subset of frames.

12. The apparatus of claim 11, wherein the instructions to adjust the second exposure time associated with the second subset of frames are executable by the processor to cause the apparatus to:
    increase a frame line length of an image sensor for the first subset of frames based at least in part on adding a set of blanking lines to a set of visible lines associated with the image sensor.

13. The apparatus of claim 11, wherein the instructions are further executable by the processor to cause the apparatus to:
    detect a light condition associated with the set of video frames, the light condition indicating a low light condition associated with the set of video frames,
    wherein the instructions to adjust the second exposure time associated with the second subset of frames are further executable by the processor based at least in part on detecting the light condition.

14. The apparatus of claim 13, wherein the instructions to detect the light condition are executable by the processor to cause the apparatus to:
determine that a brightness level associated with the set of video frames satisfies a threshold.

15. The apparatus of claim 11, wherein the instructions are further executable by the processor to cause the apparatus to:
decrease the first frame rate by a delta frame rate value to obtain the second frame rate; and
allocate a duration provided by the delta frame rate value to the second exposure time associated with the second subset of frames to obtain the third exposure time,
wherein the instructions to adjust the second exposure time are further executable by the processor based at least in part on allocating the duration provided by the delta frame rate value to the second exposure time.

16. The apparatus of claim 15, wherein the instructions are further executable by the processor to cause the apparatus to:
refrain from allocating the duration provided by the delta frame rate value to the first exposure time associated with the first subset of frames,
wherein the instructions to output the set of video frames at the second frame rate are further executable by the processor based at least in part on refraining from allocating the duration provided by the delta frame rate value to the first exposure time.

17. The apparatus of claim 11, wherein the instructions are further executable by the processor to cause the apparatus to:
determine the second frame rate based at least in part on combining a first frame from the first subset of frames associated with the first exposure time and a second frame from the second subset of frames associated with the third exposure time,
wherein the instructions to output the set of video frames at the second frame rate are further executable by the processor based at least in part on determining the second frame rate.

18. The apparatus of claim 11, wherein the instructions to adjust the second exposure time associated with the second subset of frames are executable by the processor to cause the apparatus to:
increase the second exposure time to obtain the third exposure time.

19. The apparatus of claim 11, wherein the first exposure time is equal to $1/120$ seconds, the third exposure time is equal to $3/120$ seconds, and the second frame rate is equal to 30 frames per second.

20. An apparatus for image processing at a device, comprising:
means for receiving a set of video frames at a first frame rate, the set of video frames including a first subset of frames associated with a first exposure time and a second subset of frames associated with a second exposure time;
means for adjusting the second exposure time associated with the second subset of frames;
means for determining a third exposure time for the second subset of frames based at least in part on adjusting the second exposure time associated with the second subset of frames; and
means for outputting the set of video frames at a second frame rate based at least in part on the first exposure time for the first subset of frames and the third exposure time for the second subset of frames.

* * * * *